United States Patent
Uchida et al.

(10) Patent No.: US 10,545,032 B2
(45) Date of Patent: Jan. 28, 2020

(54) ANGLE SENSOR AND ANGLE SENSOR SYSTEM

(71) Applicant: TDK CORPORATION, Tokyo (JP)

(72) Inventors: Keisuke Uchida, Tokyo (JP); Kazuya Watanabe, Tokyo (JP); Hiraku Hirabayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 218 days.

(21) Appl. No.: 15/620,272

(22) Filed: Jun. 12, 2017

(65) Prior Publication Data

US 2017/0370747 A1    Dec. 28, 2017

(30) Foreign Application Priority Data

Jun. 24, 2016   (JP) .................................. 2016-125146

(51) Int. Cl.
*G01D 5/16* (2006.01)
*G01B 7/30* (2006.01)

(52) U.S. Cl.
CPC ..................................... *G01D 5/16* (2013.01)

(58) Field of Classification Search
CPC ........... G01D 5/16; G01B 21/22; G01B 7/30; H03M 1/485
See application file for complete search history.

(56) References Cited

U.S. PATENT DOCUMENTS

| | | | |
|---|---|---|---|
| 2012/0053865 A1 | 3/2012 | Saruki et al. | |
| 2013/0335070 A1* | 12/2013 | Abe | G01B 7/30 324/207.13 |
| 2015/0204696 A1* | 7/2015 | Hirota | G01R 33/09 324/207.21 |
| 2017/0343384 A1* | 11/2017 | Nakazato | G01D 5/20 |

FOREIGN PATENT DOCUMENTS

| | | |
|---|---|---|
| CN | 202855522 U | 4/2013 |
| JP | H05-346329 A | 12/1993 |

OTHER PUBLICATIONS

Apr. 3, 2019 Office Action Issued in Chinese Patent Application No. 201710480297.X (Translation).

* cited by examiner

*Primary Examiner* — Akm Zakaria
(74) *Attorney, Agent, or Firm* — Oliff PLC

(57) ABSTRACT

An angle sensor includes a first to a fourth detection unit and an angle detection unit. Each of the first to the fourth detection unit generates two detection signals. The first to the fourth detection unit are arranged in a positional relationship that establishes predetermined phase relationships among the detection signals they generate. The angle detection unit performs operations using the detection signals to generate a first and a second signal in which an error component corresponding to a fifth or higher-order harmonic and an error component corresponding to a harmonic of the order other than the fifth order are lower than those in the detection signals. The angle detection unit then calculates a detected angle value on the basis of the first and the second signal.

14 Claims, 11 Drawing Sheets

ANGLE SENSOR AND ANGLE SENSOR SYSTEM

BACKGROUND OF THE INVENTION

1. Field of the Invention

The present invention relates to an angle sensor and an angle sensor system for generating a detected angle value having a correspondence with an angle that the direction of a rotating magnetic field forms with respect to a reference direction.

2. Description of the Related Art

In recent years, angle sensors have been widely used in various applications, such as detection of the rotational position of a steering wheel or a power steering motor in an automobile. The angle sensors generate a detected angle value having a correspondence with an angle to be detected. Examples of the angle sensors include a magnetic angle sensor. An angle sensor system using a magnetic angle sensor is typically provided with a magnetic field generation unit for generating a rotating magnetic field whose direction rotates in response to the rotation or linear movement of an object. The magnetic field generation unit is a magnet, for example. The angle to be detected by the magnetic angle sensor has a correspondence with an angle that the direction of the rotating magnetic field in a reference position forms with respect to a reference direction.

Among known magnetic angle sensors is one that includes a plurality of detection circuits for generating a plurality of detection signals of different phases and generates a detected angle value by performing an operation using the plurality of detection signals, as disclosed in US 2012/0053865 A1. Each of the plurality of detection circuits includes at least one magnetic detection element. The magnetic detection element includes, for example, a spin-valve magnetoresistance element including a magnetization pinned layer whose magnetization direction is pinned, a free layer whose magnetization direction varies depending on the direction of the rotating magnetic field, and a nonmagnetic layer located between the magnetization pinned layer and the free layer.

For the magnetic angle sensors, ideally, the plurality of detection signals each have a waveform of a sinusoidal curve (including a sine waveform and a cosine waveform) when the direction of the rotating magnetic field varies with a predetermined period. However, there are cases where the waveform of each detection signal is distorted from a sinusoidal curve. A distortion of the waveform of each detection signal may result in some error in the detected angle value. The error occurring in the detected angle value will hereinafter be referred to as angular error.

When each detection signal is distorted in waveform, each detection signal contains an ideal component and one or more error components. The ideal component varies in such a manner as to trace an ideal sinusoidal curve. The one or more error components correspond to one or more harmonics of the ideal component. When each detection signal is composed only of the ideal component, the detected angle value determined by calculation corresponds to a true angle to be detected by the angle sensor. The detected angle value determined by calculation when each detection signal is composed only of the ideal component will hereinafter be referred to as ideal angle. The angular error is the difference between the ideal angle and the detected angle value.

The causes of distortion of the waveform of each detection signal are broadly classified into a first cause related to the rotating magnetic field generated by the magnetic field generation unit and a second cause related to the magnetic detection element. In the case of an ideal angle sensor system, when the angle to be detected varies with a predetermined period, a waveform that indicates the strength of a component of the rotating magnetic field in one direction in the position of each detection circuit, which will hereinafter be referred to as a field-strength waveform, is sinusoidal, and the waveform of each detection signal generated by each detection circuit is also sinusoidal. When the waveform of each detection signal is distorted due to the first cause, the field-strength waveform is distorted from a sinusoidal curve even when the angle to be detected varies with a predetermined period. When a distortion of the waveform of each detection signal is caused by the second cause, the waveform of each detection signal is distorted from a sinusoidal curve even when the field-strength waveform is sinusoidal. A distortion of the waveform of each detection signal may also be caused by the combination of the first cause and the second cause.

US 2012/0053865 A1 describes a technique to reduce an angular error resulting from an error component corresponding to a third harmonic of the ideal component by performing an operation using at least four detection signals.

JP H05-346329A describes a technique to remove one or more harmonics from a read signal in a magnetic sensor formed of a magnetoresistance element that is relatively movable along the calibration direction of a magnetic scale. In the magnetic sensor, a plurality of linear magnetoresistance element pieces provided at mutually different positions along the calibration direction are connected in series to constitute the magnetoresistance element so as to achieve the removal of the one or more harmonics from the read signal.

For the magnetic angle sensors, the one or more error components contained in each detection signal correspond mainly to one or more third or higher-order harmonics, particularly third or higher odd-order harmonics. A conceivable method for reducing an angular error in the magnetic angle sensors is to correct each detection signal by signal processing so as to reduce the one or more error components contained in each detection signal. However, such a method requires complicated signal processing. This problem becomes more noticeable as the order of the one or more harmonics corresponding to the one or more error components becomes higher.

The technique described in US 2012/0053865 A1 is not capable of reducing an angular error caused by an error component corresponding to a fifth or higher-order harmonic.

The technique described in JP H05-346329A requires designing of the magnetoresistance element with the positions of the plurality of linear magnetoresistance element pieces varied in accordance with intervals of the calibration of the magnetic scale, thus causing difficulty in the design of the magnetoresistance element.

SUMMARY OF THE INVENTION

It is an object of the present invention to provide an angle sensor and an angle sensor system capable of easily reducing an angular error resulting from an error component corresponding to a fifth or higher-order harmonic contained in each of a plurality of detection signals.

An angle sensor of the present invention is configured to generate a detected angle value having a correspondence with an angle that the direction of a rotating magnetic field in a reference position forms with respect to a reference direction. An angle sensor system of the present invention includes the angle sensor of the present invention and a magnetic field generation unit for generating a rotating magnetic field.

The angle sensor of the present invention includes a first detection unit, a second detection unit, and an angle detection unit. The first detection unit includes a first and a second detection signal generation unit for generating a first and a second detection signal, respectively. Each of the first and the second detection signal has a correspondence with an angle that the direction of the rotating magnetic field in a first position forms with respect to a first direction. The second detection unit includes a third and a fourth detection signal generation unit for generating a third and a fourth detection signal, respectively. Each of the third and the fourth detection signal has a correspondence with an angle that the direction of the rotating magnetic field in a second position forms with respect to a second direction.

When the direction of the rotating magnetic field varies with a predetermined period, each of the first to the fourth detection signal contains an ideal component and a first error component. The ideal component varies periodically in such a manner as to trace an ideal sinusoidal curve. The first error component is an error component corresponding to an n-th harmonic of the ideal component, n being 5 or more. The ideal components of the first and the second detection signal are different in phase from each other. The ideal components of the third and the fourth detection signal are different in phase from each other.

The first detection unit and the second detection unit are arranged in a positional relationship that establishes a first phase relationship between the ideal components of the first and the third detection signal, and a second phase relationship between the ideal components of the second and the fourth detection signal. The first phase relationship is such a relationship that performing a first operation to obtain the sum of or difference between the first and the third detection signal yields a signal that is lower in the first error component than the first and the third detection signal. The second phase relationship is such a relationship that performing a second operation to obtain the sum of or difference between the second and the fourth detection signal yields a signal that is lower in the first error component than the second and the fourth detection signal.

The angle detection unit includes a first computing circuit, a second computing circuit, and an angle computing unit. The first computing circuit generates a first signal by performing operations including the first operation, the first signal being lower in the first error component than the first and the third detection signal. The second computing circuit generates a second signal by performing operations including the second operation, the second signal being lower in the first error component than the second and the fourth detection signal. The angle computing unit calculates the detected angle value on the basis of the first and the second signal.

The positional relationship between the first detection unit and the second detection unit may be such a relationship that the first position and the second position are different from each other so that the direction of the rotating magnetic field in the first position and the direction of the rotating magnetic field in the second position are different from each other.

When the positional relationship between the first detection unit and the second detection unit is such a relationship that the first position and the second position are different from each other as described above, the magnetic field generation unit of the angle sensor system may be configured to vary its relative position with respect to the first and the second detection unit in a predetermined direction, and the first position and the second position may be different from each other in the predetermined direction. The magnetic field generation unit may be configured to rotate about a central axis. In such a case, the aforementioned predetermined direction is the direction of rotation of the magnetic field generation unit. Further, in such a case, the first position and the second position may be in an imaginary plane perpendicular to the central axis and located at the same distance from the central axis. Alternatively, the first position and the second position may be on an imaginary straight line and different from each other. In such a case, the aforementioned predetermined direction is parallel to the imaginary straight line.

The positional relationship between the first detection unit and the second detection unit may be such a relationship that the first direction and the second direction are different from each other while the direction of the rotating magnetic field in the first position is the same as the direction of the rotating magnetic field in the second position.

In the angle sensor of the present invention, the first phase relationship may be a relationship in which the ideal components of the first and the third detection signal have a phase difference of 180°/n, and the second phase relationship may be a relationship in which the ideal components of the second and the fourth detection signal have a phase difference of 180°/n. In such a case, the first operation may be an operation to obtain the sum of the first and the third detection signal, and the second operation may be an operation to obtain the sum of the second and the fourth detection signal.

In the angle sensor of the present invention, the first phase relationship may be a relationship in which the ideal components of the first and the third detection signal have a phase difference of 360°/n, and the second phase relationship may be a relationship in which the ideal components of the second and the fourth detection signal have a phase difference of 360°/n. In such a case, the first operation may be an operation to obtain the difference between the first and the third detection signal, and the second operation may be an operation to obtain the difference between the second and the fourth detection signal.

The phase difference between the ideal components of the first and the second detection signal and the phase difference between the ideal components of the third and the fourth detection signal may both be 90°.

Each of the first to the fourth detection signal generation unit may include at least one magnetic detection element. The at least one magnetic detection element may include at least one magnetoresistance element. The at least one magnetoresistance element may include a magnetization pinned layer whose magnetization direction is pinned, a free layer whose magnetization direction varies depending on the direction of the rotating magnetic field, and a nonmagnetic layer located between the magnetization pinned layer and the free layer.

The angle sensor of the present invention may further include a third detection unit and a fourth detection unit. The third detection unit includes a fifth and a sixth detection signal generation unit for generating a fifth and a sixth detection signal, respectively. Each of the fifth and the sixth detection signal has a correspondence with an angle that the direction of the rotating magnetic field in a third position forms with respect to a third direction. The fourth detection unit includes a seventh and an eighth detection signal generation unit for generating a seventh and an eighth detection signal, respectively. Each of the seventh and the eighth detection signal has a correspondence with an angle that the direction of the rotating magnetic field in a fourth position forms with respect to a fourth direction.

When the direction of the rotating magnetic field varies with a predetermined period, each of the first to the eighth detection signal contains the ideal component, the first error component, and a second error component. The second error component is an error component corresponding to an m-th harmonic of the ideal component, m being different from n mentioned above. The ideal components of the fifth and the sixth detection signal are different in phase from each other. The ideal components of the seventh and the eighth detection signal are different in phase from each other.

The first to the fourth detection unit are arranged in a positional relationship that establishes the first phase relationship between the ideal components of the first and the third detection signal, the second phase relationship between the ideal components of the second and the fourth detection signal, a third phase relationship between the ideal components of the fifth and the seventh detection signal, a fourth phase relationship between the ideal components of the sixth and the eighth detection signal, a fifth phase relationship between the ideal components of the first and the fifth detection signal, a sixth phase relationship between the ideal components of the second and the sixth detection signal, a seventh phase relationship between the ideal components of the third and the seventh detection signal, and an eighth phase relationship between the ideal components of the fourth and the eighth detection signal.

The third phase relationship is such a relationship that performing a third operation to obtain the sum of or difference between the fifth and the seventh detection signal yields a signal that is lower in the first error component than the fifth and the seventh detection signal. The fourth phase relationship is such a relationship that performing a fourth operation to obtain the sum of or difference between the sixth and the eighth detection signal yields a signal that is lower in the first error component than the sixth and the eighth detection signal.

The fifth phase relationship is such a relationship that performing a fifth operation to obtain the sum of or difference between the first and the fifth detection signal yields a signal that is lower in the second error component than the first and the fifth detection signal. The sixth phase relationship is such a relationship that performing a sixth operation to obtain the sum of or difference between the second and the sixth detection signal yields a signal that is lower in the second error component than the second and the sixth detection signal. The seventh phase relationship is such a relationship that performing a seventh operation to obtain the sum of or difference between the third and the seventh detection signal yields a signal that is lower in the second error component than the third and the seventh detection signal. The eighth phase relationship is such a relationship that performing an eighth operation to obtain the sum of or difference between the fourth and the eighth detection signal yields a signal that is lower in the second error component than the fourth and the eighth detection signal.

The first computing circuit may perform operations using the first, the third, the fifth and the seventh detection signal to generate the first signal. The second computing circuit may perform operations using the second, the fourth, the sixth and the eighth detection signal to generate the second signal. The first signal is lower in the first and the second error component than the first, the third, the fifth and the seventh detection signal. The second signal is lower in the first and the second error component than the second, the fourth, the sixth and the eighth detection signal.

The positional relationship between the first to the fourth detection unit may be such a relationship that the first to the fourth position are different from each other so that the directions of the rotating magnetic field in the first to the fourth position are different from each other.

When the positional relationship between the first to the fourth detection unit is such a relationship that the first to the fourth position are different from each other as described above, the magnetic field generation unit of the angle sensor system may be configured to vary its relative position with respect to the first to the fourth detection unit in a predetermined direction, and the first to the fourth position may be different from each other in the predetermined direction. The magnetic field generation unit may be configured to rotate about a central axis. In such a case, the aforementioned predetermined direction is the direction of rotation of the magnetic field generation unit. Further, in such a case, the first to the fourth position may be in an imaginary plane perpendicular to the central axis and located at the same distance from the central axis. Alternatively, the first to the fourth position may be on an imaginary straight line and different from each other. In such a case, the aforementioned predetermined direction is parallel to the imaginary straight line.

The positional relationship between the first to the fourth detection unit may be such a relationship that the first to the fourth direction are different from each other while the the rotating magnetic field is in the same direction in the first to the fourth position.

When the angle sensor of the present invention includes the first to the fourth detection unit, the first phase relationship may be a relationship in which the ideal components of the first and the third detection signal have a phase difference of $180°/n$.

The second phase relationship may be a relationship in which the ideal components of the second and the fourth detection signal have a phase difference of $180°/n$. The third phase relationship may be a relationship in which the ideal components of the fifth and the seventh detection signal have a phase difference of $180°/n$. The fourth phase relationship may be a relationship in which the ideal components of the sixth and the eighth detection signal have a phase difference of $180°/n$. The fifth phase relationship may be a relationship in which the ideal components of the first and the fifth detection signal have a phase difference of $180°/m$. The sixth phase relationship may be a relationship in which the ideal components of the second and the sixth detection signal have a phase difference of $180°/m$. The seventh phase relationship may be a relationship in which the ideal components of the third and the seventh detection signal have a phase difference of $180°/m$. The eighth phase relationship may be a relationship in which the ideal components of the fourth and the eighth detection signal have a phase difference of $180°/m$.

In such a case, the first operation may be an operation to obtain the sum of the first and the third detection signal. The second operation may be an operation to obtain the sum of the second and the fourth detection signal. The third operation may be an operation to obtain the sum of the fifth and the seventh detection signal. The fourth operation may be an operation to obtain the sum of the sixth and the eighth detection signal. The fifth operation may be an operation to obtain the sum of the first and the fifth detection signal. The sixth operation may be an operation to obtain the sum of the second and the sixth detection signal. The seventh operation may be an operation to obtain the sum of the third and the seventh detection signal. The eighth operation may be an operation to obtain the sum of the fourth and the eighth detection signal When the angle sensor of the present invention includes the first to the fourth detection unit, the first phase relationship may be a relationship in which the ideal components of the first and the third detection signal have a phase difference of 360°/n. The second phase relationship may be a relationship in which the ideal components of the second and the fourth detection signal have a phase difference of 360°/n. The third phase relationship may be a relationship in which the ideal components of the fifth and the seventh detection signal have a phase difference of 360°/n. The fourth phase relationship may be a relationship in which the ideal components of the sixth and the eighth detection signal have a phase difference of 360°/n. The fifth phase relationship may be a relationship in which the ideal components of the first and the fifth detection signal have a phase difference of 360°/m. The sixth phase relationship may be a relationship in which the ideal components of the second and the sixth detection signal have a phase difference of 360°/m. The seventh phase relationship may be a relationship in which the ideal components of the third and the seventh detection signal have a phase difference of 360°/m. The eighth phase relationship may be a relationship in which the ideal components of the fourth and the eighth detection signal have a phase difference of 360°/m.

In such a case, the first operation may be an operation to obtain the difference between the first and the third detection signal. The second operation may be an operation to obtain the difference between the second and the fourth detection signal. The third operation may be an operation to obtain the difference between the fifth and the seventh detection signal. The fourth operation may be an operation to obtain the difference between the sixth and the eighth detection signal. The fifth operation may be an operation to obtain the difference between the first and the fifth detection signal. The sixth operation may be an operation to obtain the difference between the second and the sixth detection signal. The seventh operation may be an operation to obtain the difference between the third and the seventh detection signal. The eighth operation may be an operation to obtain the difference between the fourth and the eighth detection signal.

The phase difference between the ideal components of the first and the second detection signal, the phase difference between the ideal components of the third and the fourth detection signal, the phase difference between the ideal components of the fifth and the sixth detection signal, and the phase difference between the ideal components of the seventh and the eighth detection signal may all be 90°.

Each of the first to the eighth detection signal generation unit may include at least one magnetic detection element. The at least one magnetic detection element may include at least one magnetoresistance element. The at least one magnetoresistance element may include a magnetization pinned layer whose magnetization direction is pinned, a free layer whose magnetization direction varies depending on the direction of the rotating magnetic field, and a nonmagnetic layer located between the magnetization pinned layer and the free layer.

When the angle sensor of the present invention includes the first to the fourth detection unit, m and n mentioned above may be 3 and 5, respectively.

According to the angle sensor and the angle sensor system of the present invention, the first detection unit and the second detection unit are arranged in a predetermined positional relationship, and the angle detection unit performs relatively simple operations to generate the first and the second signal which contain reduced error components. The present invention thus enables easy reduction of the angular error resulting from an error component corresponding to a fifth or higher-order harmonic contained in each of the plurality of detection signals.

Other and further objects, features and advantages of the present invention will appear more fully from the following description.

DETAILED DESCRIPTION OF THE PREFERRED EMBODIMENTS

First Embodiment

Figure 1:
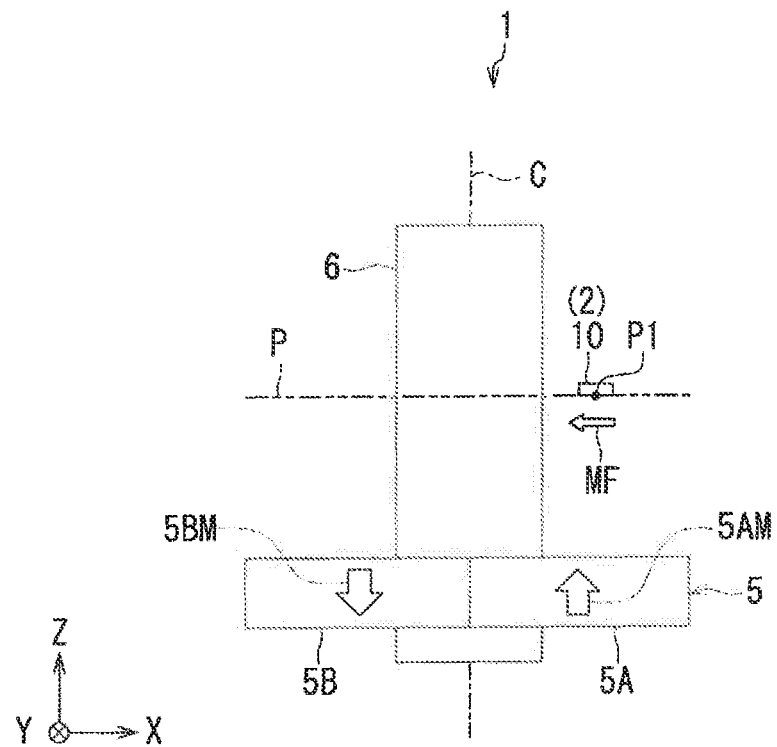
FIG. 1 is a side view illustrating the general configuration of an angle sensor system according to a first embodiment of the invention.
Figure 2:
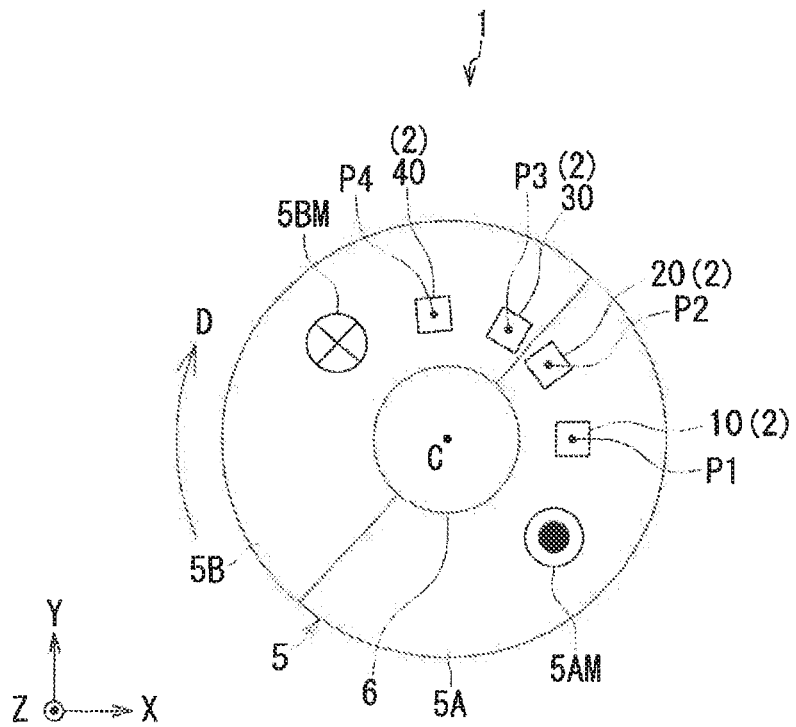
FIG. 2 is a plan view illustrating the general configuration of the angle sensor system according to the first embodiment of the invention.

Preferred embodiments of the present invention will now be described in detail with reference to the drawings. First, reference is made to FIG. 1 and FIG. 2 to describe the general configuration of an angle sensor system according to a first embodiment of the invention. The angle sensor system 1 according to the first embodiment includes an angle sensor 2 according to the first embodiment. The angle sensor 2 according to the first embodiment is a magnetic angle sensor, in particular. As shown in FIGS. 1 and 2, the angle sensor system 1 further includes a magnetic field generation unit 5 for generating a rotating magnetic field MF whose direction rotates. The angle sensor 2 is configured to generate a detected angle value having a correspondence with an angle that the direction of the rotating magnetic field MF in a reference position forms with respect to a reference direction. Hereinafter, the angle that the direction of the rotating magnetic field MF in a reference position forms with respect to a reference direction will be referred to as rotating field angle, and denoted by the symbol θM.

The magnetic field generation unit 5 of the present embodiment is a ring-shaped magnet mounted onto a rotary shaft 6, which is an object whose rotational position is to be detected. In response to the rotation of the rotary shaft 6, the magnetic field generation unit 5 rotates about a central axis C in a rotational direction D.

The magnetic field generation unit 5 includes a first portion 5A and a second portion 5B magnetized in mutually different directions. The first portion 5A and the second portion 5B are arranged symmetrically with respect to a first imaginary plane including the central axis C. In FIGS. 1 and 2, the symbol 5AM represents the magnetization direction of the first portion 5A, and the symbol 5BM represents the magnetization direction of the second portion 5B. The magnetization direction 5AM of the first portion 5A is parallel to the central axis C. The magnetization direction 5AM is upward in FIG. 1. The magnetization direction 5BM of the second portion 5B is opposite to the direction 5AM.

The reference position is located within a second imaginary plane parallel to an end face of the magnetic field generation unit 5 and perpendicular to the central axis C. The second imaginary plane will hereinafter be referred to as the reference plane P. In the reference plane P, the direction of the rotating magnetic field MF generated by the magnetic field generation unit 5 rotates about the reference position. The reference direction is located within the reference plane P and intersects the reference position. In the following description, the direction of the rotating magnetic field MF in the reference position refers to a direction located within the reference plane P.

The angle sensor 2 includes a first detection unit 10, a second detection unit 20, a third detection unit 30, and a fourth detection unit 40. The first to the fourth detection unit 10, 20, 30 and 40 are located to contact or intersect the reference plane P. The relative position of the magnetic field generation unit 5 with respect to the first to the fourth detection unit 10, 20, 30 and 40 varies in the rotational direction D about the central axis C.

Figure 3:
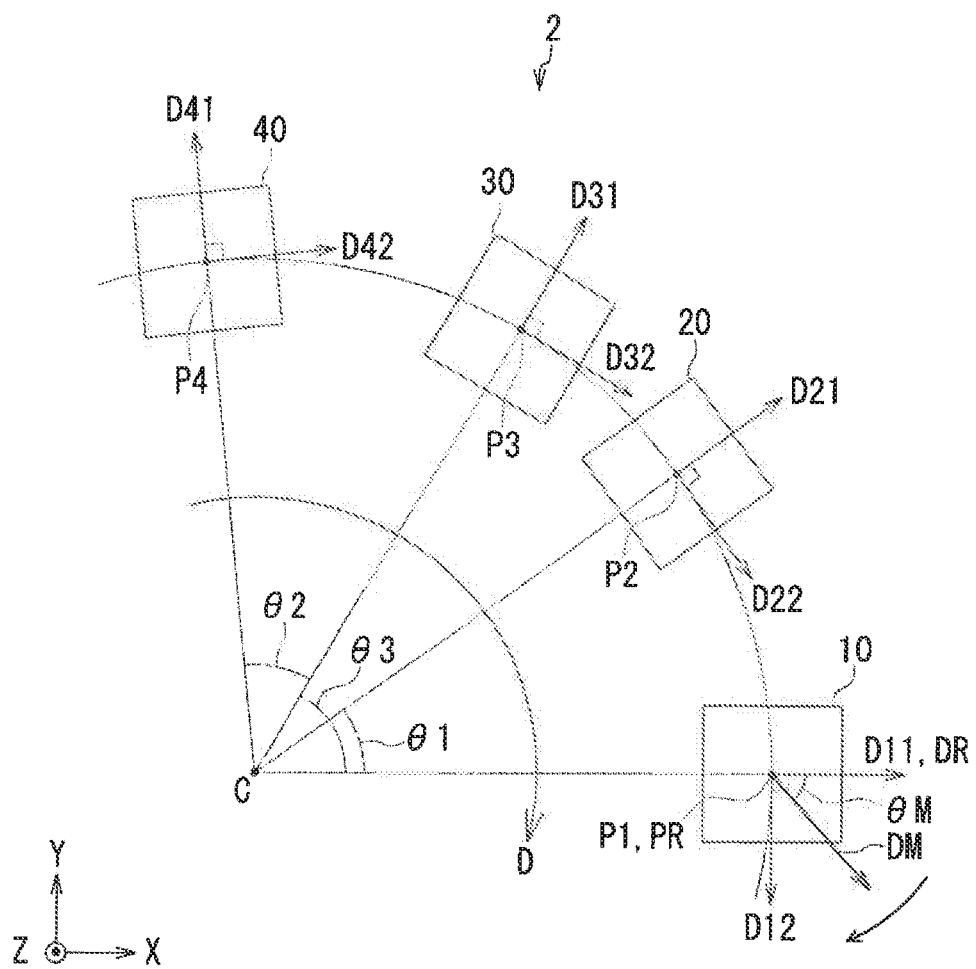
FIG. 3 is an explanatory diagram illustrating the definitions of directions and angles used in the first embodiment of the invention.

Now, the arrangement of the first to the fourth detection unit 10, 20, 30 and 40 and the definitions of directions and angles in the present embodiment will be described with reference to FIGS. 1 to 3. First, Z direction is the direction parallel to the central axis C shown in FIG. 1 and upward in FIG. 1. In FIGS. 2 and 3, the Z direction is out of the plane of the drawing. Next, X and Y directions are two directions that are perpendicular to the Z direction and orthogonal to each other. In FIG. 1, the X direction is rightward, and the Y direction is into the plane of the drawing. In FIGS. 2 and 3, the X direction is rightward, and the Y direction is upward. Further, −X direction is the direction opposite to the X direction, and −Y direction is the direction opposite to the Y direction.

The first detection unit 10 detects the rotating magnetic field MF in a first position P1. The second detection unit 20 detects the rotating magnetic field MF in a second position P2. The third detection unit 30 detects the rotating magnetic field MF in a third position P3. The fourth detection unit 40 detects the rotating magnetic field MF in a fourth position P4. The first to the fourth position P1, P2, P3 and P4 are located in the first to the fourth detection unit 10, 20, 30 and 40, respectively. In the present embodiment, the first to the fourth position P1 to P4 are different from each other in the rotational direction D so that the directions of the rotating magnetic field MF in the first to the fourth position P1 to P4 are different from each other.

As shown in FIG. 3, the first to the fourth position P1 to P4 are located within the reference plane P and at the same distance from the central axis C. The first to the fourth position P1 to P4 thus lie on the circumference of a circle about the central axis C located within the reference plane P. The reference plane P is also the XY plane including the first to the fourth position P1 to P4. In FIGS. 1 to 3, the X direction is from the central axis C to the first position P1.

The second position P2 is a position displaced counterclockwise from the first position P1 on the circumference by an angle θ1. The third position P3 is a position displaced counterclockwise from the first position P1 on the circumference by an angle θ3. The fourth position P4 is a position displaced counterclockwise from the third position P3 on the circumference by an angle θ2. The specific values of the angles θ1 to θ3 will be described later.

The first to the fourth detection unit 10, 20, 30 and 40 are located in mutually different positions so that the first to the fourth position P1 to P4 have the above-described relationship with each other. The positional relationship between the first to the fourth detection unit 10, 20, 30 and 40 will be described in more detail later.

As shown in FIG. 3, the reference position will be denoted by the symbol PR, the reference direction will be denoted by the symbol DR, and the direction of the rotating magnetic field MF will be denoted by the symbol DM. In the present embodiment, the first position P1 is the reference position PR, and the X direction is the reference direction DR. Assume that the direction DM of the rotating magnetic field MF rotates clockwise in FIG. 3. The rotating field angle θM will be expressed in positive values when seen clockwise from the reference direction DR, and in negative values when seen counterclockwise from the reference direction DR.

A first direction D11, a second direction D21, a third direction D31, a fourth direction D41, a fifth direction D12, a sixth direction D22, a seventh direction D32, and an eighth direction D42 will be defined as shown in FIG. 3. The first to the eighth direction D11, D21, D31, D41, D12, D22, D32 and D42 are all parallel to the reference plane P. The first direction D11 is from the central axis C to the first position P1. The first direction D11 is the same as the X direction and the reference direction DR. The second direction D21 is from the central axis C to the second position P2. The third direction D31 is from the central axis C to the third position P3. The fourth direction D41 is from the central axis C to the fourth position P4.

The fifth to the eighth direction D12, D22, D32 and D42 are directions that are rotated by a predetermined angle from the first to the fourth direction D11, D21, D31 and D41, respectively. In the present embodiment, the fifth to the eighth direction D12, D22, D32 and D42 are directions that are rotated clockwise by 90° from the first to the fourth direction D11, D21, D31 and D41, respectively.

Figure 4:
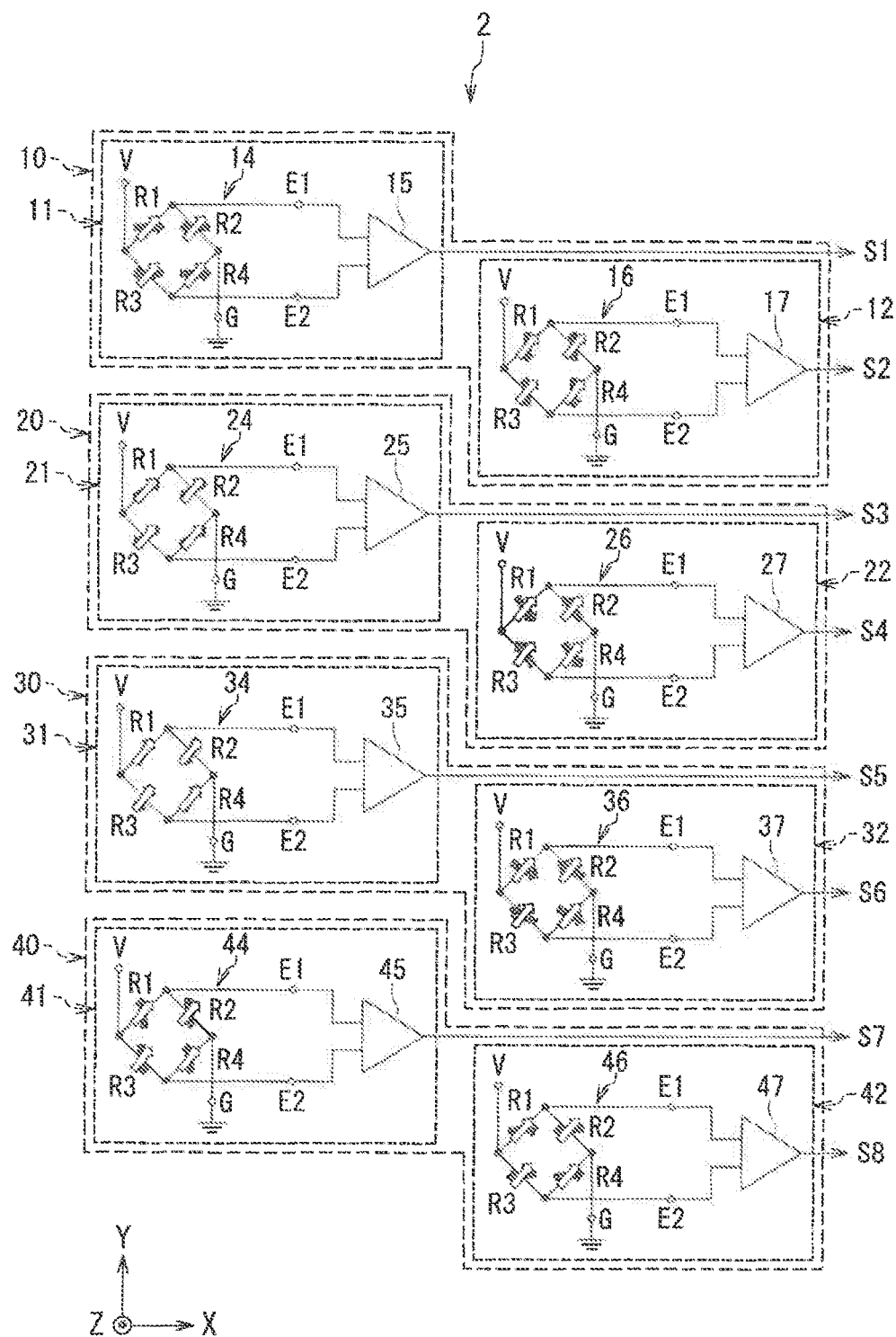
FIG. 4 is a circuit diagram illustrating the configuration of a first to a fourth detection unit of an angle sensor according to the first embodiment of the invention.

The configuration of the angle sensor 2 will now be described in detail with reference to FIG. 4. FIG. 4 is a circuit diagram illustrating the configuration of the angle sensor 2. The first detection unit 10 includes a first detection signal generation unit 11 and a second detection signal generation unit 12. The second detection unit 20 includes a third detection signal generation unit 21 and a fourth detection signal generation unit 22. The third detection unit 30 includes a fifth detection signal generation unit 31 and a sixth detection signal generation unit 32. The fourth detection unit 40 includes a seventh detection signal generation unit 41 and an eighth detection signal generation unit 42. Each of the first to the eighth detection signal generation unit 11, 12, 21, 22, 31, 32, 41 and 42 includes at least one magnetic detection element for detecting the rotating magnetic field MF. The at least one magnetic detection element may include at least one magnetoresistance element. The magnetoresistance element may be a giant magnetoresistance (GMR) element, a tunneling magnetoresistance (TMR) element, or an anisotropic magnetoresistance (AMR) element. The at least one magnetic detection element may further include at least one element for detecting a magnetic field other than the magnetoresistance element, such as a Hall element.

The first detection signal generation unit 11 generates a first detection signal S1. The second detection signal generation unit 12 generates a second detection signal S2. Each of the first and the second detection signal S1 and S2 has a correspondence with the angle that the direction DM of the rotating magnetic field MF in the first position P1 forms with respect to the first direction D11.

The third detection signal generation unit 21 generates a third detection signal S3. The fourth detection signal generation unit 22 generates a fourth detection signal S4. Each of the third and the fourth detection signal S3 and S4 has a correspondence with the angle that the direction DM of the rotating magnetic field MF in the second position P2 forms with respect to the second direction D21.

The fifth detection signal generation unit 31 generates a fifth detection signal S5. The sixth detection signal generation unit 32 generates a sixth detection signal S6. Each of the fifth and the sixth detection signal S5 and S6 has a correspondence with the angle that the direction DM of the rotating magnetic field MF in the third position P3 forms with respect to the third direction D31.

The seventh detection signal generation unit 41 generates a seventh detection signal S7. The eighth detection signal generation unit 42 generates an eighth detection signal S8. Each of the seventh and the eighth detection signal S7 and S8 has a correspondence with the angle that the direction DM of the rotating magnetic field MF in the fourth position P4 forms with respect to the fourth direction D41.

As the direction DM of the rotating magnetic field MF rotates with a predetermined period, all the first to the eighth detection signal S1 to S8 vary periodically with a signal period equal to the predetermined period. The second, the fourth, the sixth and the eighth detection signal S2, S4, S6 and S8 are different in phase from the first, the third, the fifth and the seventh detection signal S1, S3, S5 and S7, respectively. In the present embodiment, the phases of the detection signals S2, S4, S6 and S8 are preferably different from the phases of the detection signals S1, S3, S5 and S7, respectively, by an odd number of times ¼ the signal period. However, in the light of the production accuracy of the magnetic detection element and other factors, the phase difference between the respective two detection signals can be slightly different from an odd number of times ¼ the signal period. The following description assumes that the phases of the detection signals satisfy the aforementioned preferred relationship.

FIG. 4 illustrates an example of the specific configuration of the first to the eighth detection signal generation unit 11, 12, 21, 22, 31, 32, 41 and 42. This example will be described in detail below.

The first detection signal generation unit 11 includes a Wheatstone bridge circuit 14 and a difference detector 15. The second detection signal generation unit 12 includes a Wheatstone bridge circuit 16 and a difference detector 17. The third detection signal generation unit 21 includes a Wheatstone bridge circuit 24 and a difference detector 25. The fourth detection signal generation unit 22 includes a Wheatstone bridge circuit 26 and a difference detector 27. The fifth detection signal generation unit 31 includes a Wheatstone bridge circuit 34 and a difference detector 35. The sixth detection signal generation unit 32 includes a Wheatstone bridge circuit 36 and a difference detector 37. The seventh detection signal generation unit 41 includes a Wheatstone bridge circuit 44 and a difference detector 45. The eighth detection signal generation unit 42 includes a Wheatstone bridge circuit 46 and a difference detector 47.

Each of the Wheatstone bridge circuits 14, 16, 24, 26, 34, 36, 44 and 46 includes a power supply port V, a ground port G two output ports E1 and E2, a first pair of serially connected magnetic detection elements R1 and R2, and a second pair of serially connected magnetic detection elements R3 and R4. One end of each of the magnetic detection elements R1 and R3 is connected to the power supply port V. The other end of the magnetic detection element R1 is connected to one end of the magnetic detection element R2 and the output port E1. The other end of the magnetic detection element R3 is connected to one end of the magnetic detection element R4 and the output port E2. The other end of each of the magnetic detection elements R2 and R4 is connected to the ground port G A power supply voltage of predetermined magnitude is applied to the power supply port V. The ground port G is grounded.

Each of the magnetic detection elements R1 to R4 includes a plurality of magnetoresistance (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction varies depending on the direction DM of the rotating magnetic field MF, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The spin-valve MR element varies in resistance depending on the angle that the magnetization direction of the free layer forms with respect to the magnetization direction of the magnetization pinned layer, and has a minimum resistance when the foregoing angle is 0° and a maximum resistance when the foregoing angle is 180°. In FIG. 4, the filled arrows indicate the magnetization directions of the magnetization pinned layers of the MR elements, and the hollow arrows indicate the magnetization directions of the free layers of the MR elements.

In the first detection signal generation unit 11, the magnetization pinned layers of the MR elements included in the magnetic detection elements R1 and R4 are magnetized in the first direction D11, and the magnetization pinned layers of the MR elements included in the magnetic detection elements R2 and R3 are magnetized in the opposite direction to the first direction D11. In this case, the potential difference between the output ports E1 and E2 of the Wheatstone bridge circuit 14 varies depending on the strength of a component in the first direction D11 of the rotating magnetic field MF in the first position P1. The difference detector 15 outputs a signal corresponding to the potential difference between the output ports E1 and E2 of the Wheatstone bridge circuit 14 as the first detection signal S1. The first detection signal generation unit 11 thus detects the strength of the component in the first direction D11 of the rotating magnetic field MF in the first position P1 and generates the first detection signal S1 indicative of the strength. Each of this strength and the first detection signal S1 has a correspondence with the angle that the direction DM of the rotating magnetic field MF in the first position P1 forms with respect to the first direction D11.

In the second detection signal generation unit 12, the magnetization pinned layers of the MR elements included in the magnetic detection elements R1 and R4 are magnetized in the fifth direction D12, and the magnetization pinned layers of the MR elements included in the magnetic detection elements R2 and R3 are magnetized in the opposite direction to the fifth direction D12. In this case, the potential difference between the output ports E1 and E2 of the Wheatstone bridge circuit 16 varies depending on the strength of a component in the fifth direction D12 of the rotating magnetic field MF in the first position P1. The difference detector 17 outputs a signal corresponding to the potential difference between the output ports E1 and E2 of the Wheatstone bridge circuit 16 as the second detection signal S2. The second detection signal generation unit 12 thus detects the strength of the component in the fifth direction D12 of the rotating magnetic field MF in the first position P1 and generates the second detection signal S2 indicative of the strength. Each of this strength and the second detection signal S2 has a correspondence with the angle that the direction DM of the rotating magnetic field MF in the first position P1 forms with respect to the first direction D11.

In the third detection signal generation unit 21, the magnetization pinned layers of the MR elements included in the magnetic detection elements R1 and R4 are magnetized in the second direction D21, and the magnetization pinned layers of the MR elements included in the magnetic detection elements R2 and R3 are magnetized in the opposite direction to the second direction D21. In this case, the potential difference between the output ports E1 and E2 of the Wheatstone bridge circuit 24 varies depending on the strength of a component in the second direction D21 of the rotating magnetic field MF in the second position P2. The difference detector 25 outputs a signal corresponding to the potential difference between the output ports E1 and E2 of the Wheatstone bridge circuit 24 as the third detection signal S3. The third detection signal generation unit 21 thus detects the strength of the component in the second direction D21 of the rotating magnetic field MF in the second position P2 and generates the third detection signal S3 indicative of the strength. Each of this strength and the third detection signal S3 has a correspondence with the angle that the direction DM of the rotating magnetic field MF in the second position P2 forms with respect to the second direction D21.

In the fourth detection signal generation unit 22, the magnetization pinned layers of the MR elements included in the magnetic detection elements R1 and R4 are magnetized in the sixth direction D22, and the magnetization pinned layers of the MR elements included in the magnetic detection elements R2 and R3 are magnetized in the opposite direction to the sixth direction D22. In this case, the potential difference between the output ports E1 and E2 of the Wheatstone bridge circuit 26 varies depending on the strength of a component in the sixth direction D22 of the rotating magnetic field MF in the second position P2. The difference detector 27 outputs a signal corresponding to the potential difference between the output ports E1 and E2 of the Wheatstone bridge circuit 26 as the fourth detection signal S4. The fourth detection signal generation unit 22 thus detects the strength of the component in the sixth direction D22 of the rotating magnetic field MF in the second position P2 and generates the fourth detection signal S4 indicative of the strength. Each of this strength and the fourth detection signal S4 has a correspondence with the angle that the direction DM of the rotating magnetic field MF in the second position P2 forms with respect to the second direction D21.

In the fifth detection signal generation unit 31, the magnetization pinned layers of the MR elements included in the magnetic detection elements R1 and R4 are magnetized in the third direction D31, and the magnetization pinned layers of the MR elements included in the magnetic detection elements R2 and R3 are magnetized in the opposite direction to the third direction D31. In this case, the potential difference between the output ports E1 and E2 of the Wheatstone bridge circuit 34 varies depending on the strength of a component in the third direction D31 of the rotating magnetic field MF in the third position P3. The difference detector 35 outputs a signal corresponding to the potential difference between the output ports E1 and E2 of the Wheatstone bridge circuit 34 as the fifth detection signal S5. The fifth detection signal generation unit 31 thus detects the strength of the component in the third direction D31 of the rotating magnetic field MF in the third position P3 and generates the fifth detection signal S5 indicative of the strength. Each of this strength and the fifth detection signal S5 has a correspondence with the angle that the direction DM of the rotating magnetic field MF in the third position P3 forms with respect to the third direction D31.

In the sixth detection signal generation unit 32, the magnetization pinned layers of the MR elements included in the magnetic detection elements R1 and R4 are magnetized in the seventh direction D32, and the magnetization pinned layers of the MR elements included in the magnetic detection elements R2 and R3 are magnetized in the opposite direction to the seventh direction D32. In this case, the potential difference between the output ports E1 and E2 of the Wheatstone bridge circuit 36 varies depending on the strength of a component in the seventh direction D32 of the rotating magnetic field MF in the third position P3. The difference detector 37 outputs a signal corresponding to the potential difference between the output ports E1 and E2 of the Wheatstone bridge circuit 36 as the sixth detection signal S6. The sixth detection signal generation unit 32 thus detects the strength of the component in the seventh direction D32 of the rotating magnetic field MF in the third position P3 and generates the sixth detection signal S6 indicative of the strength. Each of this strength and the sixth detection signal S6 has a correspondence with the angle that the direction DM of the rotating magnetic field MF in the third position P3 forms with respect to the third direction D31.

In the seventh detection signal generation unit 41, the magnetization pinned layers of the MR elements included in the magnetic detection elements R1 and R4 are magnetized in the fourth direction D41, and the magnetization pinned layers of the MR elements included in the magnetic detection elements R2 and R3 are magnetized in the opposite direction to the fourth direction D41. In this case, the potential difference between the output ports E1 and E2 of the Wheatstone bridge circuit 44 varies depending on the strength of a component in the fourth direction D41 of the rotating magnetic field MF in the fourth position P4. The difference detector 45 outputs a signal corresponding to the potential difference between the output ports E1 and E2 of the Wheatstone bridge circuit 44 as the seventh detection signal S7. The seventh detection signal generation unit 41 thus detects the strength of the component in the fourth direction D41 of the rotating magnetic field MF in the fourth position P4 and generates the seventh detection signal S7 indicative of the strength. Each of this strength and the seventh detection signal S7 has a correspondence with the angle that the direction DM of the rotating magnetic field MF in the fourth position P4 forms with respect to the fourth direction D41.

In the eighth detection signal generation unit 42, the magnetization pinned layers of the MR elements included in the magnetic detection elements R1 and R4 are magnetized in the eighth direction D42, and the magnetization pinned layers of the MR elements included in the magnetic detection elements R2 and R3 are magnetized in the opposite direction to the eighth direction D42. In this case, the potential difference between the output ports E1 and E2 of the Wheatstone bridge circuit 46 varies depending on the strength of a component in the eighth direction D42 of the rotating magnetic field MF in the fourth position P4. The difference detector 47 outputs a signal corresponding to the potential difference between the output ports E1 and E2 of the Wheatstone bridge circuit 46 as the eighth detection signal S8. The eighth detection signal generation unit 42 thus detects the strength of the component in the eighth direction D42 of the rotating magnetic field MF in the fourth position P4 and generates the eighth detection signal S8 indicative of the strength. Each of this strength and the eighth detection signal S8 has a correspondence with the angle that the direction DM of the rotating magnetic field MF in the fourth position P4 forms with respect to the fourth direction D41.

The first to the fourth detection unit 10, 20, 30 and 40 may be constructed of four discrete components. The four discrete components may have the same mechanical structure, and be configured so that the magnetizations of the plurality of magnetization pinned layers are in the same relative direction with respect to the mechanical structure. In such a case, the magnetization directions of the magnetization pinned layers of the above-described MR elements can be easily defined by adjusting the layout and the orientations of the four discrete components.

In the light of the production accuracy of the MR elements and other factors, the magnetization directions of the mag-netization pinned layers of the plurality of MR elements in the detection signal generation units 11, 12, 21, 22, 31, 32, 41 and 42 may be slightly different from the above-described directions.

Figure 6:
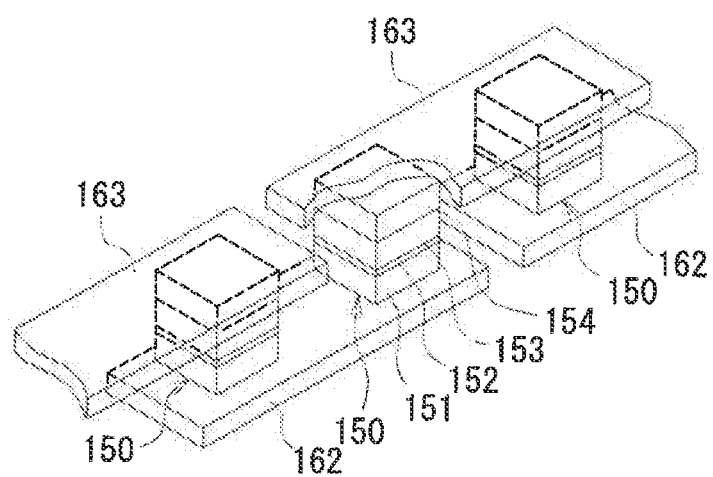
FIG. 6 is a perspective view of a portion of a magnetic detection element shown in FIG. 4.

An example of the configuration of the magnetic detection elements will now be described with reference to FIG. 6. FIG. 6 is a perspective view illustrating a portion of a magnetic detection element in the angle sensor 2 shown in FIG. 4. In this example, the magnetic detection element includes a plurality of lower electrodes 162, a plurality of MR elements 150 and a plurality of upper electrodes 163. The plurality of lower electrodes 162 are arranged on a substrate (not illustrated). Each of the lower electrodes 162 has a long slender shape. Every two lower electrodes 162 that are adjacent to each other in the longitudinal direction of the lower electrodes 162 have a gap therebetween. As shown in FIG. 6, MR elements 150 are provided on the top surfaces of the lower electrodes 162, near opposite ends in the longitudinal direction. Each of the MR elements 150 includes a free layer 151, a nonmagnetic layer 152, a magnetization pinned layer 153, and an antiferromagnetic layer 154 which are stacked in this order, the free layer 151 being closest to the lower electrode 162. The free layer 151 is electrically connected to the lower electrode 162. The antiferromagnetic layer 154 is formed of an antiferromagnetic material. The antiferromagnetic layer 154 is in exchange coupling with the magnetization pinned layer 153 so as to pin the magnetization direction of the magnetization pinned layer 153. The plurality of upper electrodes 163 are arranged over the plurality of MR elements 150. Each of the upper electrodes 163 has a long slender shape, and establishes electrical connection between the respective antiferromagnetic layers 154 of two adjacent MR elements 150 that are arranged on two lower electrodes 162 adjacent in the longitudinal direction of the lower electrodes 162. With such a configuration, the plurality of MR elements 150 in the magnetic detection element shown in FIG. 6 are connected in series by the plurality of lower electrodes 162 and the plurality of upper electrodes 163. It should be appreciated that the layers 151 to 154 of the MR elements 150 may be stacked in the reverse order to that shown in FIG. 6.

As mentioned previously, as the direction DM of the rotating magnetic field MF rotates with a predetermined period, all the first to the eighth detection signal S1 to S8 vary periodically with a signal period equal to the predetermined period. Ideally, the first to the eighth detection signal S1 to S8 each have a waveform of a sinusoidal curve (including a sine waveform and a cosine waveform). In actuality, however, there are cases where the waveforms of the first to the eighth detection signal S1 to S8 are distorted from a sinusoidal curve. The causes of distortion of the waveforms of the first to the eighth detection signal S1 to S8 are broadly classified into the following two: a first cause related to the rotating magnetic field MF generated by the magnetic field generation unit 5; and a second cause related to the magnetic detection elements.

The distortion of the waveforms of the first to the eighth detection signal S1 to S8 means that the first to the eighth detection signal S1 to S8 each contain an ideal component which varies periodically in such a manner as to trace an ideal sinusoidal curve, and an error component other than the ideal component. In such a case, some error may occur in the detected angle value. The error occurring in the detected angle value will hereinafter be referred to as angular error. A detected angle value determined by calculation when each of the first to the eighth detection signal S1 to S8 is composed only of the ideal component corresponds to the true angle to be detected by the angle sensor 2. The detected angle value determined by calculation when each of the first to the eighth detection signal S1 to S8 is composed only of the ideal component will hereinafter be referred to as ideal angle. The angular error is the difference between the ideal angle and the detected angle value. When the waveforms of the first to the eighth detection signal S1 to S8 are distorted due to the first cause, the rotating field angle θM may differ from the ideal angle.

In the present embodiment, when the direction DM of the rotating magnetic field MF varies with a predetermined period, each of the first to the eighth detection signal S1 to S8 contains the ideal component and a first and a second error component. The first error component is an error component corresponding to an n-th harmonic of the ideal component, n being 5 or more. The second error component is an error component corresponding to an m-th harmonic of the ideal component, m being different from n. In the present embodiment, in particular, m is 3 and n is 5.

The ideal components of the first and the second detection signal S1 and S2 are different in phase from each other. The ideal components of the third and the fourth detection signal S3 and S4 are different in phase from each other. The ideal components of the fifth and the sixth detection signal S5 and S6 are different in phase from each other. The deal components of the seventh and the eighth detection signal S7 and S8 are different in phase from each other. In the present embodiment, the phase difference between the ideal components of the first and the second detection signal S1 and S2, the phase difference between the ideal components of the third and the fourth detection signal S3 and S4, the phase difference between the ideal components of the fifth and the sixth detection signal S5 and S6, and the phase difference between the ideal components of the seventh and the eighth detection signal S7 and S8 are all 90°.

Figure 5:
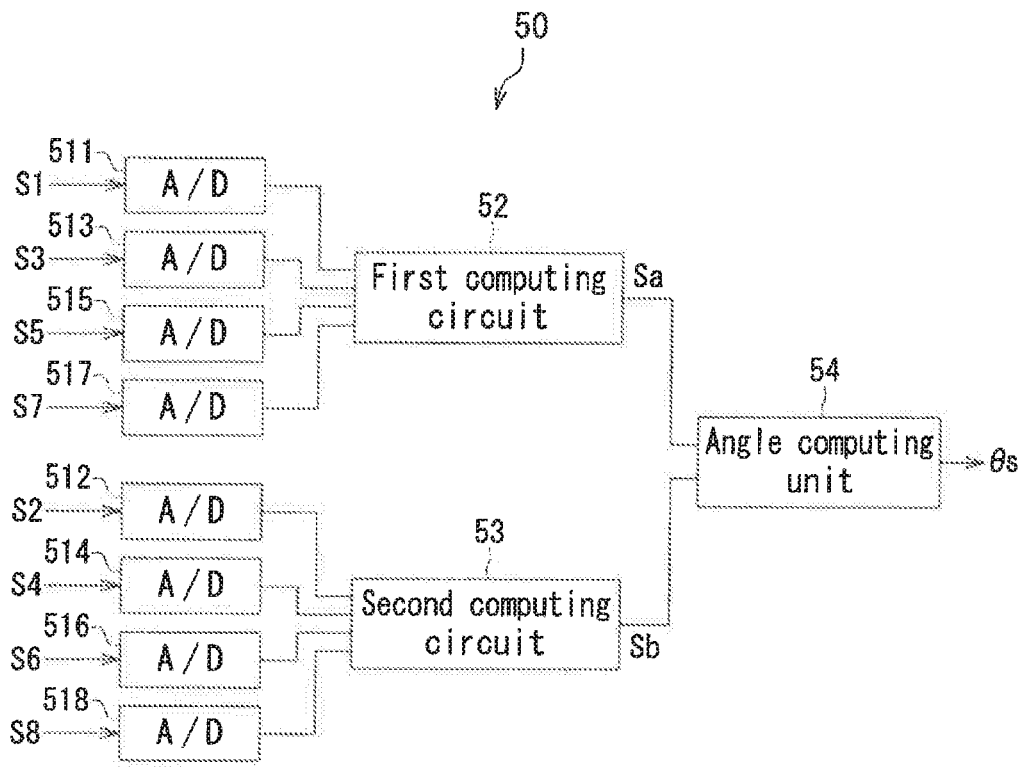
FIG. 5 is a functional block diagram illustrating the configuration of an angle detection unit of the angle sensor according to the first embodiment of the invention.

Now, parts of the angle sensor 2 other than the first to the fourth detection unit 10, 20, 30 and 40 will be described with reference to FIG. 5. The angle sensor 2 includes an angle detection unit 50 aside from the first to the fourth detection unit 10, 20, 30 and 40. The angle detection unit 50 generates a detected angle value θs having a correspondence with the rotating field angle θM. FIG. 5 is a functional block diagram illustrating the configuration of the angle detection unit 50. The angle detection unit 50 can be implemented by an application-specific integrated circuit (ASIC) or a microcomputer, for example.

The angle detection unit 50 includes a first computing circuit 52 for generating a first signal Sa, a second computing circuit 53 for generating a second signal Sb, and an angle computing unit 54 for calculating the detected angle value θs on the basis of the first and the second signal Sa and Sb.

The angle detection unit 50 further includes analog-to-digital converters (hereinafter, "A/D converters") 511, 512, 513, 514, 515, 516, 517 and 518. The first computing circuit 52, the second computing circuit 53 and the angle computing unit 54 use digital signals. The A/D converters 511-518 respectively convert the first to the eighth detection signal S1-S8 to digital signals. The first computing circuit 52 generates the first signal Sa by performing operations using the first, the third, the fifth and the seventh detection signal S1, S3, S5 and S7, which have been converted to digital signals by the A/D converters 511, 513, 515 and 517, respectively. The second computing circuit 53 generates the second signal Sb by performing operations using the second, the fourth, the sixth and the eighth detection signal S2, S4, S6 and S8, which have been converted to digital signals by the A/D converters 512, 514, 516 and 518, respectively. The method for generating the first and the second signal Sa and Sb and the method for calculating the detected angle value θs will be described in detail later.

Now, the positional relationship between the first to the fourth detection unit 10, 20, 30 and 40 will be described in detail. The first to the fourth detection unit 10, 20, 30 and 40 are arranged in a positional relationship that establishes the following plurality of phase relationships. Specifically, the positional relationship establishes a first phase relationship between the ideal components of the first and the third detection signal S1 and S3, a second phase relationship between the ideal components of the second and the fourth detection signal S2 and S4, a third phase relationship between the ideal components of the fifth and the seventh detection signal S5 and S7, a fourth phase relationship between the ideal components of the sixth and the eighth detection signal S6 and S8, a fifth phase relationship between the ideal components of the first and the fifth detection signal S1 and S5, a sixth phase relationship between the ideal components of the second and the sixth detection signal S2 and S6, a seventh phase relationship between the ideal components of the third and the seventh detection signal S3 and S7, and an eighth phase relationship between the ideal components of the fourth and the eighth detection signal S4 and S8.

The first phase relationship is such a relationship that performing a first operation to obtain the sum of or difference between the first and the third detection signal S1 and S3 yields a signal that is lower in the first error component than the first and the third detection signal S1 and S3.

The second phase relationship is such a relationship that performing a second operation to obtain the sum of or difference between the second and the fourth detection signal S2 and S4 yields a signal that is lower in the first error component than the second and the fourth detection signal S2 and S4.

The third phase relationship is such a relationship that performing a third operation to obtain the sum of or difference between the fifth and the seventh detection signal S5 and S7 yields a signal that is lower in the first error component than the fifth and the seventh detection signal S5 and S7.

The fourth phase relationship is such a relationship that performing a fourth operation to obtain the sum of or difference between the sixth and the eighth detection signal S6 and S8 yields a signal that is lower in the first error component than the sixth and the eighth detection signal S6 and S8.

The fifth phase relationship is such a relationship that performing a fifth operation to obtain the sum of or difference between the first and the fifth detection signal S1 and S5 yields a signal that is lower in the second error component than the first and the fifth detection signal S1 and S5.

The sixth phase relationship is such a relationship that performing a sixth operation to obtain the sum of or difference between the second and the sixth detection signal S2 and S6 yields a signal that is lower in the second error component than the second and the sixth detection signal S2 and S6.

The seventh phase relationship is such a relationship that performing a seventh operation to obtain the sum of or difference between the third and the seventh detection signal S3 and S7 yields a signal that is lower in the second error component than the third and the seventh detection signal S3 and S7.

The eighth phase relationship is such a relationship that performing an eighth operation to obtain the sum of or difference between the fourth and the eighth detection signal S4 and S8 yields a signal that is lower in the second error component than the fourth and the eighth detection signal S4 and S8.

A first example and a second example of the present embodiment will be described below. The first example will be described first. In the first example, the first phase relationship is a relationship in which the ideal components of the first and the third detection signal S1 and S3 have a phase difference of 180°/n, and the second phase relationship is a relationship in which the ideal components of the second and the fourth detection signal S2 and S4 have a phase difference of 180°/n. In such a case, the first operation is an operation to obtain the sum of the first and the third detection signal S1 and S3, and the second operation is an operation to obtain the sum of the second and the fourth detection signal S2 and S4. In the first example, the first and the second detection unit 10 and 20 are arranged to establish the first and the second phase relationship described above. To be more specific, the first and the second position P1 and P2 are defined to make the angle θ1 of FIG. 3 have a magnitude equivalent to an electrical angle of 180°/n.

The third phase relationship is a relationship in which the ideal components of the fifth and the seventh detection signal S5 and S7 have a phase difference of 180°/n, and the fourth phase relationship is a relationship in which the ideal components of the sixth and the eighth detection signal S6 and S8 have a phase difference of 180°/n. In such a case, the third operation is an operation to obtain the sum of the fifth and the seventh detection signal S5 and S7, and the fourth operation is an operation to obtain the sum of the sixth and the eighth detection signal S6 and S8. In the first example, the third and the fourth detection unit 30 and 40 are arranged to establish the third and the fourth phase relationship described above. To be more specific, the third and the fourth position P3 and P4 are defined to make the angle θ2 of FIG. 3 have a magnitude equivalent to an electrical angle of 180°/n.

The fifth phase relationship is a relationship in which the ideal components of the first and the fifth detection signal S1 and S5 have a phase difference of 180°/m, and the sixth phase relationship is a relationship in which the ideal components of the second and the sixth detection signal S2 and S6 have a phase difference of 180°/m. In such a case, the fifth operation is an operation to obtain the sum of the first and the fifth detection signal S1 and S5, and the sixth operation is an operation to obtain the sum of the second and the sixth detection signal S2 and S6. In the first example, the first and the third detection unit 10 and 30 are arranged to establish the fifth and the sixth phase relationship described above. To be more specific, the first and the third position P1 and P3 are defined to make the angle θ3 of FIG. 3 have a magnitude equivalent to an electrical angle of 180°/m.

The seventh phase relationship is a relationship in which the ideal components of the third and the seventh detection signal S3 and S7 have a phase difference of 180°/m, and the eighth phase relationship is a relationship in which the ideal components of the fourth and the eighth detection signal S4 and S8 have a phase difference of 180°/m. In such a case, the seventh operation is an operation to obtain the sum of the third and the seventh detection signal S3 and S7, and the eighth operation is an operation to obtain the sum of the fourth and the eighth detection signal S4 and S8. The seventh and the eighth phase relationship described above are achieved by defining the first to the fourth position P1 to P4 in such a way as to establish the first to the sixth phase relationship.

In the present embodiment, in particular, m is 3 and n is 5. Thus, 180°/m is 60°, and 180°/n is 36°. One period of the first to the eighth detection signal S1 to S8, i.e., an electrical angle of 360°, is equivalent to one rotation of the magnetic field generation unit 5, i.e., a rotational angle of 360° of the magnetic field generation unit 5. Thus, in the first example, the first to the fourth detection unit 10, 20, 30 and 40 are arranged by defining the first to the fourth position P1 to P4 to make both of the angles θ1 and θ2 be 36° and make the angle θ3 be 60°.

Now, the ideal component of the first detection signal S1 will be denoted by cos θ, and the ideal component of the second detection signal S2 will be denoted by sin θ. The first and the second detection signal S1 and S2 are expressible by the following Eqs. (1) and (2), respectively. In Eq. (1), "$a_1 \cdot \cos(n\theta)$" represents the first error component of the first detection signal S1, and "$b_1 \cdot \cos(m\theta)$" represents the second error component of the first detection signal S1. In Eq. (2), "$a_2 \cdot \sin(n\theta)$" represents the first error component of the second detection signal S2, and "$b_2 \cdot \sin(m\theta)$" represents the second error component of the second detection signal S2.

$$S1 = \cos\theta + a_1 \cdot \cos(n\theta) + b_1 \cdot \cos(m\theta) \qquad (1)$$

$$S2 = \sin\theta + a_2 \cdot \sin(n\theta) + b_2 \cdot \sin(m\theta) \qquad (2)$$

According to the first example, the third and the fourth detection signal S3 and S4 are expressible by the following Eqs. (3) and (4), respectively.

$$\begin{aligned}
S3 &= \cos(\theta + 180°/n) + \\
   &\quad a_1 \cdot \cos\{n(\theta + 180°/n)\} + \\
   &\quad b_1 \cdot \cos\{m(\theta + 180°/n)\} \\
   &= \cos(\theta + 180°/n) + \\
   &\quad a_1 \cdot \cos(n\theta + 180°) + \\
   &\quad b_1 \cdot \cos\{m(\theta + 180°/n)\} \\
   &= \cos(\theta + 180°/n) - \\
   &\quad a_1 \cdot \cos(n\theta) + \\
   &\quad b_1 \cdot \cos\{m(\theta + 180°/n)\}
\end{aligned} \qquad (3)$$

$$\begin{aligned}
S4 &= \sin(\theta + 180°/n) + \\
   &\quad a_2 \cdot \sin\{n(\theta + 180°/n)\} + \\
   &\quad b_2 \cdot \sin\{m(\theta + 180°/n)\} \\
   &= \sin(\theta + 180°/n) + \\
   &\quad a_2 \cdot \sin(n\theta + 180°) + \\
   &\quad b_2 \cdot \sin\{m(\theta + 180°/n)\} \\
   &= \sin(\theta + 180°/n) - \\
   &\quad a_2 \cdot \sin(n\theta) + \\
   &\quad b_2 \cdot \sin\{m(\theta + 180°/n)\}
\end{aligned} \qquad (4)$$

The fifth and the sixth detection signal S5 and S6 are expressible by the following Eqs. (5) and (6), respectively.

$$\begin{aligned}
S5 &= \cos(\theta + 180°/m) + \\
   &\quad a_1 \cdot \cos\{n(\theta + 180°/m)\} + \\
   &\quad b_1 \cdot \cos\{m(\theta + 180°/m)\} \\
   &= \cos(\theta + 180°/m) + \\
   &\quad a_1 \cdot \cos\{n(\theta + 180°/m)\} + \\
   &\quad b_1 \cdot \cos(m\theta + 180°) \\
   &= \cos(\theta + 180°/m) + \\
   &\quad a_1 \cdot \cos\{n(\theta + 180°/m)\} - \\
   &\quad b_1 \cdot \cos(m\theta)
\end{aligned} \qquad (5)$$

-continued $$S6 = \sin(\theta + 180°/m) + \\ a_2 \cdot \sin\{n(\theta + 180°/m)\} + \\ b_2 \cdot \sin\{m(\theta + 180°/m)\} \\ = \sin(\theta + 180°/m) + \\ a_2 \cdot \sin\{n(\theta + 180°/m)\} + \\ b_2 \cdot \sin(m\theta + 180°) \\ = \sin(\theta + 180°/m) + \\ a_2 \cdot \sin\{n(\theta + 180°/m)\} - \\ b_2 \cdot \sin(m\theta) \quad (6)$$

The seventh and the eighth detection signal S7 and S8 are expressible by the following Eqs. (7) and (8), respectively.

$$S7 = \cos(\theta + 180°/n + 180°/m) + \\ a_1 \cdot \cos\{n(\theta + 180°/n + 180°/m)\} + \\ b_1 \cdot \cos\{m(\theta + 180°/n + 180°/m)\} \\ = \cos(\theta + 180°/n + 180°/m) + \\ a_1 \cdot \cos\{n(\theta + 180°/m) + 180°\} + \\ b_1 \cdot \cos\{m(\theta + 180°/n) + 180°\} \\ = \cos(\theta + 180°/n + 180°/m) - \\ a_1 \cdot \cos\{n(\theta + 180°/m)\} - \\ b_1 \cdot \cos(m(\theta + 180°/n)) \quad (7)$$

$$S8 = \sin(\theta + 180°/n + 180°/m) + \\ a_2 \cdot \sin\{n(\theta + 180°/n + 180°/m)\} + \\ b_2 \cdot \sin\{m(\theta + 180°/n + 180°/m)\} \\ = \sin(\theta + 180°/n + 180°/m) + \\ a_2 \cdot \sin\{n(\theta + 180°/m) + 180°\} + \\ b_2 \cdot \sin\{m(\theta + 180°/n) + 180°\} \\ = \sin(\theta + 180°/n + 180°/m) - \\ a_2 \cdot \sin\{n(\theta + 180°/m)\} - \\ b_2 \cdot \sin(m(\theta + 180°/n)) \quad (8)$$

As is understood from Eqs. (1) and (3), performing the first operation of the first example, that is, the operation to obtain the sum of the first and the third detection signal S1 and S3, allows the first error component $a_1 \cdot \cos(n\theta)$ of Eq. (1) and the first error component $-a_1 \cdot \cos(n\theta)$ of Eq. (3) to cancel each other out to thereby yield a signal that is lower in the first error component than the first and the third detection signal S1 and S3.

As is understood from Eqs. (2) and (4), performing the second operation of the first example, that is, the operation to obtain the sum of the second and the fourth detection signal S2 and S4, allows the first error component $a_2 \cdot \sin(n\theta)$ of Eq. (2) and the first error component $-a_2 \cdot \sin(n\theta)$ of Eq. (4) to cancel each other out to thereby yield a signal that is lower in the first error component than the second and the fourth detection signal S2 and S4.

As is understood from Eqs. (5) and (7), performing the third operation of the first example, that is, the operation to obtain the sum of the fifth and the seventh detection signal S5 and S7, allows the first error component $a_1 \cdot \cos\{n(\theta+180°/m)\}$ of Eq. (5) and the first error component $-a_1 \cdot \cos\{n(\theta+180°/m)\}$ of Eq. (7) to cancel each other out to thereby yield a signal that is lower in the first error component than the fifth and the seventh detection signal S5 and S7.

As is understood from Eqs. (6) and (8), performing the fourth operation of the first example, that is, the operation to obtain the sum of the sixth and the eighth detection signal S6 and S8, allows the first error component $a_2 \cdot \sin\{n(\theta+180°/m)\}$ of Eq. (6) and the first error component $-a_2 \cdot \sin\{n(\theta+180°/m)\}$ of Eq. (8) to cancel each other out to thereby yield a signal that is lower in the first error component than the sixth and the eighth detection signal S6 and S8.

As is understood from Eqs. (1) and (5), performing the fifth operation of the first example, that is, the operation to obtain the sum of the first and the fifth detection signal S1 and S5, allows the second error component $b_1 \cdot \cos(m\theta)$ of Eq. (1) and the second error component $-b_1 \cdot \cos(m\theta)$ of Eq. (5) to cancel each other out to thereby yield a signal that is lower in the second error component than the first and the fifth detection signal S1 and S5.

As is understood from Eqs. (2) and (6), performing the sixth operation of the first example, that is, the operation to obtain the sum of the second and the sixth detection signal S2 and S6, allows the second error component $b_2 \cdot \sin(m\theta)$ of Eq. (2) and the second error component $-b_2 \cdot \sin(m\theta)$ of Eq. (6) to cancel each other out to thereby yield a signal that is lower in the second error component than the second and the sixth detection signal S2 and S6.

As is understood from Eqs. (3) and (7), performing the seventh operation of the first example, that is, the operation to obtain the sum of the third and the seventh detection signal S3 and S7, allows the second error component $b_1 \cdot \cos\{m(\theta+180°/n)\}$ of Eq. (3) and the second error component $-b_1 \cdot \cos\{m(\theta+180°/n)\}$ of Eq. (7) to cancel each other out to thereby yield a signal that is lower in the second error component than the third and the seventh detection signal S3 and S7.

As is understood from Eqs. (4) and (8), performing the eighth operation of the first example, that is, the operation to obtain the sum of the fourth and the eighth detection signal S4 and S8, allows the second error component $b_2 \cdot \sin\{m(\theta+180°/n)\}$ of Eq. (4) and the second error component $-b_2 \cdot \sin\{m(\theta+180°/n)\}$ of Eq. (8) to cancel each other out to thereby yield a signal that is lower in the second error component than the fourth and the eighth detection signal S4 and S8.

Figure 7:
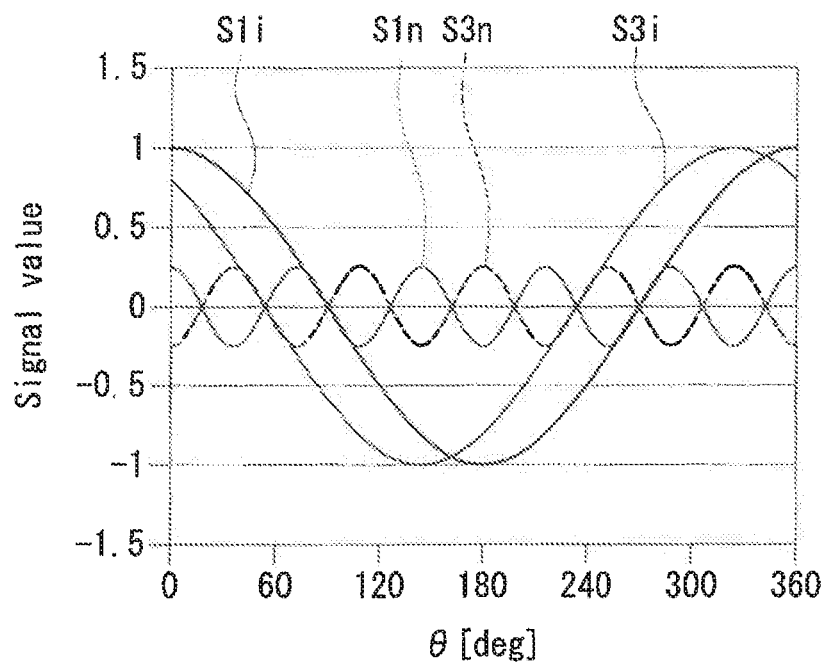
FIG. 7 is a waveform diagram illustrating an example of the waveforms of a first and a third detection signal in a first example of the first embodiment of the invention.
Figure 8:
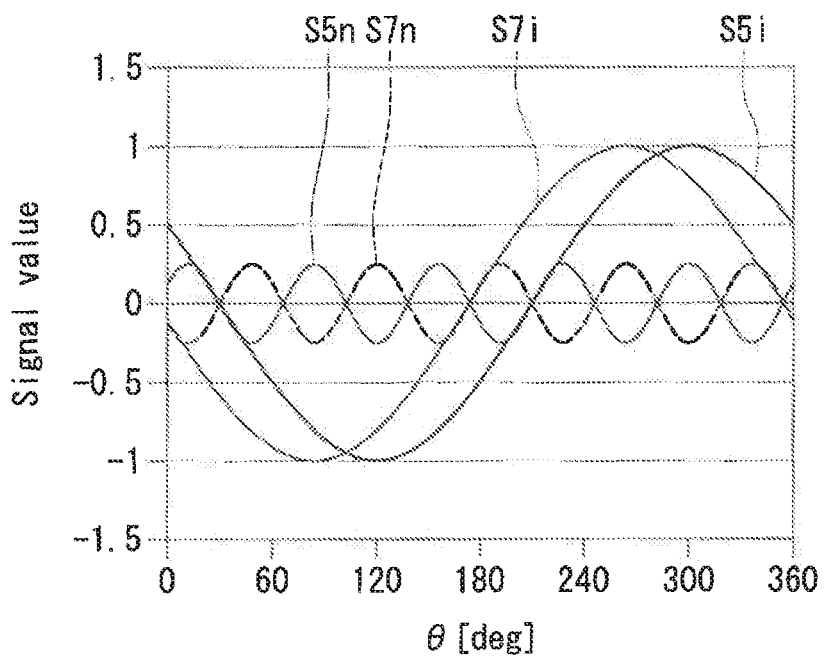
FIG. 8 is a waveform diagram illustrating an example of the waveforms of a fifth and a seventh detection signal in the first example of the first embodiment of the invention.
Figure 9:
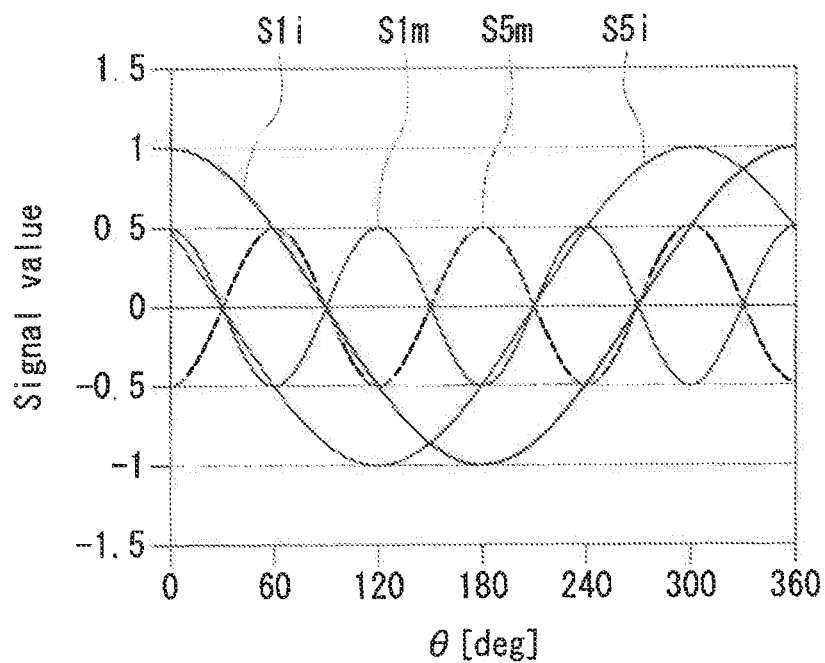
FIG. 9 is a waveform diagram illustrating an example of the waveforms of the first and the fifth detection signal in the first example of the first embodiment of the invention.
Figure 10:
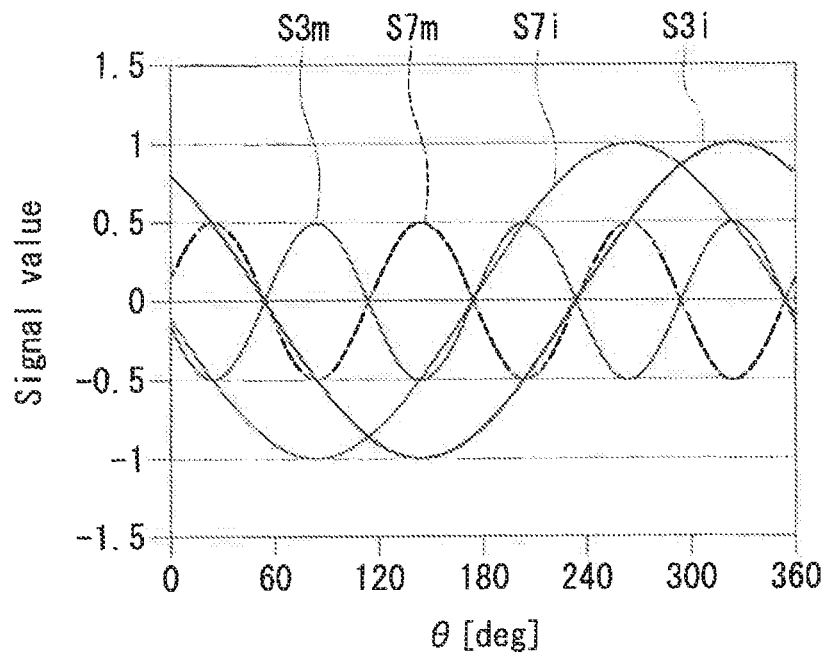
FIG. 10 is a waveform diagram illustrating an example of the waveforms of the third and the seventh detection signal in the first example of the first embodiment of the invention.

FIG. 7 is a waveform diagram illustrating an example of the waveforms of the first and the third detection signal S1 and S3 in the first example. FIG. 8 is a waveform diagram illustrating an example of the waveforms of the fifth and the seventh detection signal S5 and S7 in the first example. FIG. 9 is a waveform diagram illustrating an example of the waveforms of the first and the fifth detection signal S1 and S5 in the first example. FIG. 10 is a waveform diagram illustrating an example of the waveforms of the third and the seventh detection signal S3 and S7 in the first example. In each of FIGS. 7 to 10, the horizontal axis represents the ideal angle $\theta$, and the vertical axis represents "signal value", which is the value of each signal expressed with the maximum value of the ideal component of each of the first, the third, the fifth and the seventh detection signal S1, S3, S5 and S7 normalized at 1. The symbols S1$i$, S3$i$, S5$i$ and S7$i$ represent the ideal components of the first, the third, the fifth and the seventh detection signal S1, S3, S5 and S7, respectively. The symbols S1$n$, S3$n$, S5$n$ and S7$n$ represent the first error components of the first, the third, the fifth and the seventh detection signal S1, S3, S5 and S7, respectively. The symbols S1$m$, S3$m$, S5$m$ and S7$m$ represent the second error components of the first, the third, the fifth and the seventh detection signal S1, S3, S5 and S7, respectively.

As shown in FIG. 7, the first error component S1$n$ of the first detection signal S1 and the first error component S3$n$ of the third detection signal S3 have such a phase relationship that they cancel each other out when the operation to obtain the sum of the first and the third detection signal S1 and S3 is performed. As shown in FIG. 8, the first error component S5n of the fifth detection signal S5 and the first error component S7n of the seventh detection signal S7 have such a phase relationship that they cancel each other out when the operation to obtain the sum of the fifth and the seventh detection signal S5 and S7 is performed. As shown in FIG. 9, the second error component S1m of the first detection signal S1 and the second error component S5m of the fifth detection signal S5 have such a phase relationship that they cancel each other out when the operation to obtain the sum of the first and the fifth detection signal S1 and S5 is performed. As shown in FIG. 10, the second error component S3m of the third detection signal S3 and the second error component S7m of the seventh detection signal S7 have such a phase relationship that they cancel each other out when the operation to obtain the sum of the third and the seventh detection signal S3 and S7 is performed.

Although not illustrated, the first error component of the second detection signal S2 and the first error component of the fourth detection signal S4 have such a phase relationship that they cancel each other out when the operation to obtain the sum of the second and the fourth detection signal S2 and S4 is performed. The first error component of the sixth detection signal S6 and the first error component of the eighth detection signal S8 have such a phase relationship that they cancel each other out when the operation to obtain the sum of the sixth and the eighth detection signal S6 and S8 is performed. The second error component of the second detection signal S2 and the second error component of the sixth detection signal S6 have such a phase relationship that they cancel each other out when the operation to obtain the sum of the second and the sixth detection signal S2 and S6 is performed. The second error component of the fourth detection signal S4 and the second error component of the eighth detection signal S8 have such a phase relationship that they cancel each other out when the operation to obtain the sum of the fourth and the eighth detection signal S4 and S8 is performed.

The second example will now be described. In the second example, the first phase relationship is a relationship in which the ideal components of the first and the third detection signal S1 and S3 have a phase difference of 360°/n, and the second phase relationship is a relationship in which the ideal components of the second and the fourth detection signal S2 and S4 have a phase difference of 360°/n. In such a case, the first operation is an operation to obtain the difference between the first and the third detection signal S1 and S3, and the second operation is an operation to obtain the difference between the second and the fourth detection signal S2 and S4. In the second example, the first and the second detection unit 10 and 20 are arranged to establish the first and the second phase relationship described above. To be more specific, the first and the second position P1 and P2 are defined to make the angle θ1 of FIG. 3 have a magnitude equivalent to an electrical angle of 360°/n.

The third phase relationship is a relationship in which the ideal components of the fifth and the seventh detection signal S5 and S7 have a phase difference of 360°/n, and the fourth phase relationship is a relationship in which the ideal components of the sixth and the eighth detection signal S6 and S8 have a phase difference of 360°/n. In such a case, the third operation is an operation to obtain the difference between the fifth and the seventh detection signal S5 and S7, and the fourth operation is an operation to obtain the difference between the sixth and the eighth detection signal S6 and S8. In the second example, the third and the fourth detection unit 30 and 40 are arranged to establish the third and the fourth phase relationship described above. To be more specific, the third and the fourth position P3 and P4 are defined to make the angle θ2 of FIG. 3 have a magnitude equivalent to an electrical angle of 360°/n.

The fifth phase relationship is a relationship in which the ideal components of the first and the fifth detection signal S1 and S5 have a phase difference of 360°/m, and the sixth phase relationship is a relationship in which the ideal components of the second and the sixth detection signal S2 and S6 have a phase difference of 360°/m. In such a case, the fifth operation is an operation to obtain the difference between the first and the fifth detection signal S1 and S5, and the sixth operation is an operation to obtain the difference between the second and the sixth detection signal S2 and S6. In the second example, the first and the third detection unit 10 and 30 are arranged to establish the fifth and the sixth phase relationship described above. To be more specific, the first and the third position P1 and P3 are defined to make the angle θ3 of FIG. 3 have a magnitude equivalent to an electrical angle of 360°/m.

The seventh phase relationship is a relationship in which the ideal components of the third and the seventh detection signal S3 and S7 have a phase difference of 360°/m, and the eighth phase relationship is a relationship in which the ideal components of the fourth and the eighth detection signal S4 and S8 have a phase difference of 360°/m. In such a case, the seventh operation is an operation to obtain the difference between the third and the seventh detection signal S3 and S7, and the eighth operation is an operation to obtain the difference between the fourth and the eighth detection signal S4 and S8. The seventh and the eighth phase relationship described above are achieved by defining the first to the fourth position P1 to P4 in such a way as to establish the first to the sixth phase relationship.

In the present embodiment, in particular, 360°/n is 72°, and 360°/m is 120°. According to the second example, the first to the fourth detection unit 10, 20, 30 and 40 are arranged by defining the first to the fourth position P1 to P4 to make both of the angles θ1 and θ2 be 72° and make the angle θ3 be 120°.

If the first and the second detection signal S1 and S2 are expressed by Eqs. (1) and (2) as in the first example, then in the second example the third and the fourth detection signal S3 and S4 are expressible by the following Eqs. (9) and (10), respectively.

$$S3 = \cos(\theta + 360°/n) + \qquad (9)$$
$$a_1 \cdot \cos\{n(\theta + 360°/n)\} +$$
$$b_1 \cdot \cos\{m(\theta + 360°/n)\}$$
$$= \cos(\theta + 360°/n) +$$
$$a_1 \cdot \cos(n\theta + 360°) +$$
$$b_1 \cdot \cos\{m(\theta + 360°/n)\}$$
$$= \cos(\theta + 360°/n) +$$
$$a_1 \cdot \cos(n\theta) +$$
$$b_1 \cdot \cos\{m(\theta + 360°/n)\}$$

$$S4 = \sin(\theta + 360°/n) + \qquad (10)$$
$$a_2 \cdot \sin\{n(\theta + 360°/n)\} +$$
$$b_2 \cdot \sin\{m(\theta + 360°/n)\}$$
$$= \sin(\theta + 360°/n) +$$
$$a_2 \cdot \sin(n\theta + 360°) +$$
$$b_2 \cdot \sin\{m(\theta + 360°/n)\}$$
$$= \sin(\theta + 360°/n) +$$
$$a_2 \cdot \sin(n\theta) +$$
$$b_2 \cdot \sin\{m(\theta + 360°/n)\}$$

The fifth and the sixth detection signal S5 and S6 are expressible by the following Eqs. (11) and (12), respectively.

$$S5 = \cos(\theta + 360°/m) + \qquad (11)$$
$$a_1 \cdot \cos\{n(\theta + 360°/m)\} +$$
$$b_1 \cdot \cos\{m(\theta + 360°/m)\}$$
$$= \cos(\theta + 360°/m) +$$
$$a_1 \cdot \cos\{n(\theta + 360°/m)\} +$$
$$b_1 \cdot \cos(m\theta + 360°)$$
$$= \cos(\theta + 360°/m) +$$
$$a_1 \cdot \cos\{n(\theta + 360°/m)\} +$$
$$b_1 \cdot \cos(m\theta)$$

$$S6 = \sin(\theta + 360°/m) + \qquad (12)$$
$$a_2 \cdot \sin\{n(\theta + 360°/m)\} +$$
$$b_2 \cdot \sin\{m(\theta + 360°/m)\}$$
$$= \sin(\theta + 360°/m) +$$
$$a_2 \cdot \sin\{n(\theta + 360°/m)\} +$$
$$b_2 \cdot \sin(m\theta + 360°)$$
$$= \sin(\theta + 360°/m) +$$
$$a_2 \cdot \sin\{n(\theta + 360°/m)\} +$$
$$b_2 \cdot \sin(m\theta)$$

The seventh and the eighth detection signal S7 and S8 are expressible by the following Eqs. (13) and (14), respectively.

$$S7 = \cos(\theta + 360°/n + 360°/m) + \qquad (13)$$
$$a_1 \cdot \cos\{n(\theta + 360°/n + 360°/m)\} +$$
$$b_1 \cdot \cos\{m(\theta + 360°/n + 360°/m)\}$$
$$= \cos(\theta + 360°/n + 360°/m) +$$
$$a_1 \cdot \cos\{n(\theta + 360°/m) + 360°\} +$$
$$b_1 \cdot \cos\{m(\theta + 360°/n + 360°)\}$$
$$= \cos(\theta + 360°/n + 360°/m) +$$
$$a_1 \cdot \cos\{n(\theta + 360°/m)\} +$$
$$b_1 \cdot \cos\{m(\theta + 360°/n)\}$$

$$S8 = \sin(\theta + 360°/n + 360°/m) + \qquad (14)$$
$$a_2 \cdot \sin\{n(\theta + 360°/n + 360°/m)\} +$$
$$b_2 \cdot \sin\{m(\theta + 360°/n + 360°/m)\}$$
$$= \sin(\theta + 360°/n + 360°/m) +$$
$$a_2 \cdot \sin\{n(\theta + 360°/m) + 360°\} +$$
$$b_2 \cdot \sin\{m(\theta + 360°/n) + 360°\}$$
$$= \sin(\theta + 360°/n + 360°/m) +$$
$$a_2 \cdot \sin\{n(\theta + 360°/m)\} +$$
$$b_2 \cdot \sin\{m(\theta + 360°/n)\}$$

As is understood from Eqs. (1) and (9), performing the first operation of the second example, that is, the operation to obtain the difference between the first and the third detection signal S1 and S3, allows the first error component $a_1 \cdot \cos(n\theta)$ of Eq. (1) and the first error component $a_1 \cdot \cos(n\theta)$ of Eq. (9) to cancel each other out to thereby yield a signal that is lower in the first error component than the first and the third detection signal S1 and S3.

As is understood from Eqs. (2) and (10), performing the second operation of the second example, that is, the operation to obtain the difference between the second and the fourth detection signal S2 and S4, allows the first error component $a_2 \cdot \sin(n\theta)$ of Eq. (2) and the first error component $a_2 \cdot \sin(n\theta)$ of Eq. (10) to cancel each other out to thereby yield a signal that is lower in the first error component than the second and the fourth detection signal S2 and S4.

As is understood from Eqs. (11) and (13), performing the third operation of the second example, that is, the operation to obtain the difference between the fifth and the seventh detection signal S5 and S7, allows the first error component $a_1 \cdot \cos\{n(\theta+360°/m)\}$ of Eq. (11) and the first error component $a_1 \cdot \cos\{n(\theta+360°/m)\}$ of Eq. (13) to cancel each other out to thereby yield a signal that is lower in the first error component than the fifth and the seventh detection signal S5 and S7.

As is understood from Eqs. (12) and (14), performing the fourth operation of the second example, that is, the operation to obtain the difference between the sixth and the eighth detection signal S6 and S8, allows the first error component $a_2 \cdot \sin\{n(\theta+360°/m)\}$ of Eq. (12) and the first error component $a_2 \cdot \sin\{n(\theta+360°/m)\}$ of Eq. (14) to cancel each other out to thereby yield a signal that is lower in the first error component than the sixth and the eighth detection signal S6 and S8.

As is understood from Eqs. (1) and (11), performing the fifth operation of the second example, that is, the operation to obtain the difference between the first and the fifth detection signal S1 and S5, allows the second error component $b_1 \cdot \cos(m\theta)$ of Eq. (1) and the second error component $b_1 \cdot \cos(m\theta)$ of Eq. (11) to cancel each other out to thereby yield a signal that is lower in the second error component than the first and the fifth detection signal S1 and S5.

As is understood from Eqs. (2) and (12), performing the sixth operation of the second example, that is, the operation to obtain the difference between the second and the sixth detection signal S2 and S6, allows the second error component $b_2 \cdot \sin(m\theta)$ of Eq. (2) and the second error component $b_2 \cdot \sin(m\theta)$ of Eq. (12) to cancel each other out to thereby yield a signal that is lower in the second error component than the second and the sixth detection signal S2 and S6.

As is understood from Eqs. (9) and (13), performing the seventh operation of the second example, that is, the operation to obtain the difference between the third and the seventh detection signal S3 and S7, allows the second error component $b_1 \cdot \cos\{m(\theta+360°/n)\}$ of Eq. (9) and the second error component $b_1 \cdot \cos\{m(\theta+360°/n)\}$ of Eq. (13) to cancel each other out to thereby yield a signal that is lower in the second error component than the third and the seventh detection signal S3 and S7.

As is understood from Eqs. (10) and (14), performing the eighth operation of the second example, that is, the operation to obtain the difference the fourth and the eighth detection signal S4 and S8, allows the second error component $b_2 \cdot \sin\{m(\theta+360°/n)\}$ of Eq. (10) and the second error component $b_2 \cdot \sin\{m(\theta+360°/n)\}$ of Eq. (14) to cancel each other out to thereby yield a signal that is lower in the second error component than the fourth and the eighth detection signal S4 and S8.

According to the present embodiment, regardless of whether the first cause or the second cause distorts the waveform of each of the first to the eighth detection signal S1 to S8, if the first and the second detection signal S1 and S2 are expressed by Eqs. (1) and (2), respectively, then Eqs. (3) to (8) hold in the first example and Eqs. (9) to (14) hold in the second example.

Now, a method for generating the first and the second signal Sa and Sb and a method for calculating the detected angle value θs will be described. First, a description will be given of the method for generating the first and the second signal Sa and Sb and the method for calculating the detected angle value θs according to the foregoing first example. As described previously, the first computing circuit 52 generates the first signal Sa by performing operations using the first, the third, the fifth and the seventh detection signal S1, S3, S5 and S7. The operations performed by the first computing circuit 52 include the first operation, the third operation, the fifth operation and the seventh operation of the first example. To be more specific, for example, the first computing circuit 52 generates the first signal Sa by the following Eq. (15). Eq. (15) uses the first, the third, the fifth and the seventh detection signal S1, S3, S5 and S7 expressed by Eqs. (1), (3), (5) and (7), respectively. In the following description, $\alpha=180°/n$ and $\beta=180°/m$.

$$\begin{aligned}Sa &= S1 + S3 + S5 + S7 \\ &= \cos\theta + \cos(\theta+\alpha) + \cos(\theta+\beta) + \cos(\theta+\alpha+\beta) \\ &= 2\cos(\theta+\alpha/2)\cdot\cos(-\alpha/2) + \\ &\quad 2\cos(\theta+\alpha/2+\beta)\cdot\cos(-\alpha/2) \\ &= 4\cos(\alpha/2)\cdot\cos(\theta+\alpha/2+\beta/2)\cdot\cos(-\beta/2) \\ &= 4\cos(\alpha/2)\cdot\cos(\beta/2)\cdot\cos(\theta+\alpha/2+\beta/2)\end{aligned} \quad (15)$$

The operations performed by the first computing circuit 52 cause the two first error components of Eqs. (1) and (3) to cancel each other out, causes the two first error components of Eqs. (5) and (7) to cancel each other out, causes the two second error components of Eqs. (1) and (5) to cancel each other out, and causes the two second error components of Eqs. (3) and (7) to cancel each other out. This causes the first signal Sa to be lower in the first and the second error component than the first, the third, the fifth and the seventh detection signal S1, S3, S5 and S7.

As described previously, the second computing circuit 53 generates the second signal Sb by performing operations using the second, the fourth, the sixth and the eighth detection signal S2, S4, S6 and S8. The operations performed by the second computing circuit 53 include the second operation, the fourth operation, the sixth operation and the eighth operation of the first example. To be more specific, for example, the second computing circuit 53 generates the second signal Sb by the following Eq. (16). Eq. (16) uses the second, the fourth, the sixth and the eighth detection signal S2, S4, S6 and S8 expressed by Eqs. (2), (4), (6) and (8), respectively.

$$\begin{aligned}Sb &= S2 + S4 + S6 + S8 \\ &= \sin\theta + \sin(\theta+\alpha) + \sin(\theta+\beta) + \sin(\theta+\alpha+\beta) \\ &= 2\sin(\theta+\alpha/2)\cdot\cos(-\alpha/2) + \\ &\quad 2\sin(\theta+\alpha/2+\beta)\cdot\cos(-\alpha/2) \\ &= 4\cos(\alpha/2)\cdot\sin(\theta+\alpha/2+\beta/2)\cdot\cos(-\beta/2) \\ &= 4\cos(\alpha/2)\cdot\cos(\beta/2)\cdot\sin(\theta+\alpha/2+\beta/2)\end{aligned} \quad (16)$$

The operations performed by the second computing circuit 53 cause the two first error components of Eqs. (2) and (4) to cancel each other out, causes the two first error components of Eqs. (6) and (8) to cancel each other out, causes the two second error components of Eqs. (2) and (6) to cancel each other out, and causes the two second error components of Eqs. (4) and (8) to cancel each other out. This causes the second signal Sb to be lower in the first and the second error component than the second, the fourth, the sixth and the eighth detection signal S2, S4, S6 and S8.

The angle computing unit 54 calculates the detected angle value $\theta s$ on the basis of the first and the second signal Sa and Sb. More specifically, for example, the angle computing unit 54 calculates $\theta s$ by the following Eq. (17) using the first and the second signal Sa and Sb generated by Eqs. (15) and (16). Note that "a tan" in Eq. (17) represents arc tangent.

$$\theta s = a\tan(Sb/Sa) - (\alpha/2+\beta/2) \quad (17)$$

If $\theta s$ is in the range of 0° to less than 360°, $\theta s$ in Eq. (17) has two solutions 180° different in value. Which of the two solutions of $\theta s$ in Eq. (17) is the true value of $\theta s$ can be determined from the combination of positive and negative signs of Sa and Sb. The angle computing unit 54 determines $\theta s$ within the range of 0° to less than 360° on the basis of Eq. (17) and the foregoing determination on the combination of positive and negative signs of Sa and Sb.

Now, a description will be given of the method for generating the first and the second signal Sa and Sb and the method for calculating the detected angle value θ according to the foregoing second example. The operations performed by the first computing circuit 52 include the first operation, the third operation, the fifth operation and the seventh operation of the second example. To be more specific, for example, the first computing circuit 52 generates the first signal Sa by the following Eq. (18). Eq. (18) uses the first, the third, the fifth and the seventh detection signal S1, S3, S5 and S7 expressed by Eqs. (1), (9), (11) and (13), respectively. In the following description, $\gamma=360°/n$ and $\delta=360°/m$.

$$\begin{aligned}Sa &= S1 - S3 - S5 + S7 \\ &= \cos\theta - \cos(\theta+\gamma) - \cos(\theta+\delta) + \cos(\theta+\gamma+\delta) \\ &= -2\sin(\theta+\gamma/2)\cdot\sin(-\gamma/2) + \\ &\quad 2\sin(\theta+\gamma/2+\delta)\cdot\sin(-\gamma/2) \\ &= 4\sin(\gamma/2)\cdot\sin(-\delta/2)\cdot\cos(\theta+\gamma/2+\delta/2) \\ &= -4\sin(\gamma/2)\cdot\sin(\delta/2)\cdot\cos(\theta+\gamma/2+\delta/2)\end{aligned} \quad (18)$$

The operations performed by the first computing circuit 52 cause the two first error components of Eqs. (1) and (9) to cancel each other out, causes the two first error components of Eqs. (11) and (13) to cancel each other out, causes the two second error components of Eqs. (1) and (11) to cancel each other out, and causes the two second error components of Eqs. (9) and (13) to cancel each other out. This causes the first signal Sa to be lower in the first and the second error component than the first, the third, the fifth and the seventh detection signal S1, S3, S5 and S7.

The operations performed by the second computing circuit 53 include the second operation, the fourth operation, the sixth operation and the eighth operation of the second example. To be more specific, for example, the second computing circuit 53 generates the second signal Sb by the following Eq. (19). Eq. (19) uses the second, the fourth, the sixth and the eighth detection signal S2, S4, S6 and S8 expressed by Eqs. (2), (10), (12) and (14), respectively.

$$\begin{aligned}Sb &= S2 - S4 - S6 + S8 \\ &= \sin\theta - \sin(\theta+\gamma) - \sin(\theta+\delta) + \sin(\theta+\gamma+\delta) \\ &= 2\sin(-\gamma/2)\cdot\cos(\theta+\gamma/2) - \\ &\quad 2\sin(-\gamma/2)\cdot\cos(\theta+\gamma/2+\delta)\end{aligned} \quad (19)$$

$$= 4\sin(\gamma/2)\cdot\sin(\theta+\gamma/2+\delta/2)\cdot\sin(-\delta/2)$$
$$= -4\sin(\gamma/2)\cdot\sin(\delta/2)\cdot\sin(\theta+\gamma/2+\delta/2)$$

The operations performed by the second computing circuit 53 cause the two first error components of Eqs. (2) and (10) to cancel each other out, causes the two first error components of Eqs. (12) and (14) to cancel each other out, causes the two second error components of Eqs. (2) and (12) to cancel each other out, and causes the two second error components of Eqs. (10) and (14) to cancel each other out. This causes the second signal Sb to be lower in the first and the second error component than the second, the fourth, the sixth and the eighth detection signal S2, S4, S6 and S8.

The angle computing unit 54 calculates the detected angle value θs on the basis of the first and the second signal Sa and Sb. More specifically, the angle computing unit 54 calculates θs by the following Eq. (20) using the first and the second signal Sa and Sb generated by Eqs. (18) and (19).

$$\theta s = a\tan(Sb/Sa) - (\gamma/2+\delta/2) \quad (20)$$

If θs is in the range of 0° to less than 360°, θs in Eq. (20) has two solutions 180° different in value. Which of the two solutions of θs in Eq. (20) is the true value of θs can be determined from the combination of positive and negative signs of Sa and Sb. The angle computing unit 54 determines θs within the range of 0° to less than 360° on the basis of Eq. (20) and the foregoing determination on the combination of positive and negative signs of Sa and Sb.

Note that the positional relationship between the first to the fourth detection unit 10, 20, 30 and 40 in the present embodiment is not limited to the first and the second example described above. The first to the fourth detection unit 10, 20, 30 and 40 may be arranged in any positional relationship that establishes the first to the eighth phase relationship.

For example, the first to the fourth detection unit 10, 20, 30 and 40 may be arranged in a positional relationship that makes the angles θ1 and θ2 have a magnitude equivalent to an electrical angle of 180°/n and makes the angle θ3 have a magnitude equivalent to an electrical angle of 360°/m. In such a case, for example, the first computing circuit 52 generates the first signal Sa by the following Eq. (21) and the second computing circuit 53 generates the second signal Sb by the following Eq. (22). The first and the second signal Sa and Sb thus obtained are lower in the first and the second error component.

$$Sa = S1+S3-S5-S7 \quad (21)$$

$$Sb = S2+S4-S6-S8 \quad (22)$$

The first to the fourth detection unit 10, 20, 30 and 40 may be arranged in a positional relationship that makes the angles θ1 and θ2 have a magnitude equivalent to an electrical angle of 360°/n and makes the angle θ3 have a magnitude equivalent to an electrical angle of 180°/m. In such a case, for example, the first computing circuit 52 generates the first signal Sa by the following Eq. (23) and the second computing circuit 53 generates the second signal Sb by the following Eq. (24). The first and the second signal Sa and Sb thus obtained are lower in the first and the second error component.

$$Sa = S1-S3+S5-S7 \quad (23)$$

$$Sb = S2-S4+S6-S8 \quad (24)$$

As described above, in the angle sensor 2 and the angle sensor system 1 according to the present embodiment, the first to the fourth detection unit 10, 20, 30 and 40 are arranged in the predetermined positional relationship, and the angle detection unit 50 performs relatively simple operations, such as addition and subtraction, to generate the first and the second signal Sa and Sb which are lower in the first and the second error component. The present embodiment thus enables easy reduction of the angular error resulting from the first error component and the second error component contained in the first to the eighth detection signal S1 to S8, the first error component corresponding to a fifth or higher-order harmonic, the second error component corresponding to a harmonic of the order different from that of the first error component.

Another conceivable method for reducing the angular error resulting from the first and the second error component is to correct each of the first to the eighth detection signal S1 to S8 by signal processing so as to reduce the first and the second error component contained in each of the first to the eighth detection signal S1 to S8. To be more specific, for example, a Fourier transform may be applied to the waveform of each of the first to the eighth detection signal S1 to S8 to cancel out the first and the second error component contained in each of the first to the eighth detection signal S1 to S8 on the basis of the results. However, such a method requires complicated signal processing. This problem becomes more noticeable as the order of the error components becomes higher.

In contrast, according to the present embodiment, the first and the second signal Sa and Sb which are lower in the first and the second error component are generated by performing the relatively simple operations as described above. Further, the present embodiment enables reduction of the error component of any given order by adjusting the positional relationship between the first to the fourth detection unit 10, 20, 30 and 40. As a result, the present embodiment makes it easier to reduce the angular error resulting from the first and the second error component than in the case of correcting each of the first to the eighth detection signal S1 to S8 by signal processing.

Further, the present embodiment enables reduction of the angular error resulting from the first and the second error component when the causes of distortion of the waveform of each of the first to the eighth detection signal S1 to S8 include at least one of the first cause and the second cause.

Now, the angular-error-reducing effect of the present embodiment will be specifically shown using the following example. First, a value corresponding to the detected angle value θs calculated on the basis of the first detection signal S1 and the second detection signal S2 will be referred to as uncorrected detected angle value, and denoted by the symbol θp. The uncorrected detected angle value θp is expressed by the following Eq. (25).

$$\theta p = a\tan(S2/S1) \quad (25)$$

If θp is in the range of 0° to less than 360°, θp in Eq. (25) has two solutions 180° different in value. Which of the two solutions of θp in Eq. (25) is the true value of θp can be determined from the combination of positive and negative signs of S1 and S2.

An angular error occurring in the uncorrected detected angle value θp will be denoted by the symbol Ep, and an angular error occurring in the detected angle value θs will be denoted by the symbol Es. The angular errors Ep and Es are calculated by a control unit (not illustrated) outside the angle sensor system 1 under a situation in which the control unit can recognize the true angle to be detected by the angle sensor 2. An example of such a situation is when the control unit commands a change of the true angle to be detected, or when the control unit is able to obtain information about the true angle to be detected. The true angle to be detected is the rotational angle of the magnetic field generation unit 5, for example. The true angle to be detected that the control unit recognizes will hereinafter be referred to as the reference angle θr, in particular. The ideal angle θ corresponds to the true angle to be detected and the reference angle θr. The angular errors Ep and Es are calculated by the following Eqs. (26) and (27), respectively.

$$Ep=\theta p-\theta r \quad (26)$$

$$Es=\theta s-\theta r \quad (27)$$

Figure 11:
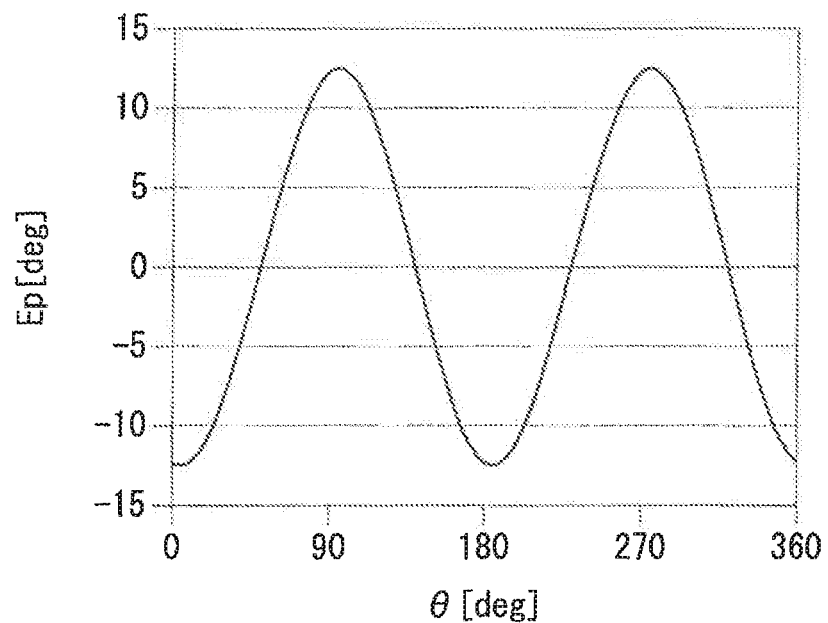
FIG. 11 is a waveform diagram illustrating an example of the waveform of an angular error occurring in an uncorrected detected angle value.
Figure 12:
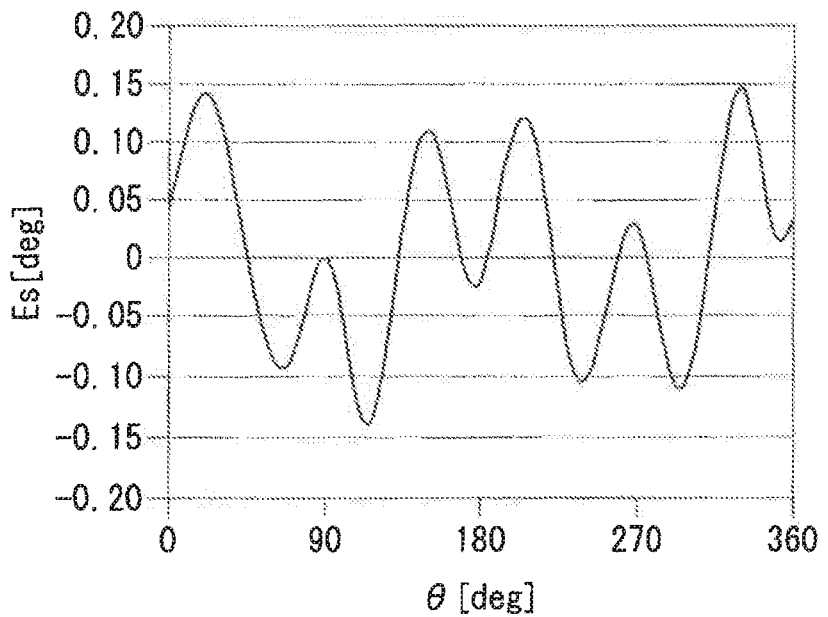
FIG. 12 is a waveform diagram illustrating an example of the waveform of an angular error occurring in a detected angle value.

FIG. 11 is a waveform diagram illustrating an example of the waveform of the angular error Ep occurring in the uncorrected detected angle value θp. FIG. 12 is a waveform diagram illustrating an example of the waveform of the angular error Es occurring in the detected angle value θs. In FIG. 11 and FIG. 12, the horizontal axis represents the ideal angle θ equal to the reference angle θr, and the vertical axis represents the magnitude of the angular error Ep or Es.

The first and the second detection signal S1 and S2 are signals before the first and the second error component are reduced. The angular error Ep occurring in the uncorrected detected angle value θp mainly results from the first and the second error component. As shown in FIGS. 11 and 12, the angular error Es occurring in the detected angle value θs is smaller than the angular error Ep occurring in the uncorrected detected angle value θp. In this way, the present embodiment achieves reduction of the angular error resulting from the first and the second error component.

The angle sensor and the angle sensor system of the present invention may be configured to reduce an angular error that results from the first error component only. In such a case, the third and the fourth detection unit 30 and 40 are omitted from the angle sensor 2. Further, in such a case, the first computing circuit 52 generates the first signal Sa by setting S5 and S7 at 0 in the foregoing equations for generating the first signal Sa, and the second computing circuit 53 generates the second signal Sb by setting S6 and S8 at 0 in the foregoing equations for generating the second signal Sb.

Second Embodiment

A second embodiment of the invention will now be described. First, reference is made to FIG. 13 to describe the general configuration of an angle sensor system according to the second embodiment. The angle sensor system 1 according to the second embodiment differs from that according to the first embodiment in the following ways. The angle sensor system 1 according to the second embodiment includes a magnetic field generation unit 7 in place of the magnetic field generation unit 5 of the first embodiment. The magnetic field generation unit 7 of the present embodiment is a magnet of a cylindrical shape for generating a rotating magnetic field MF whose direction rotates. The magnetic field generation unit 7 rotates about a central axis C in a rotational direction D.

Figure 13:
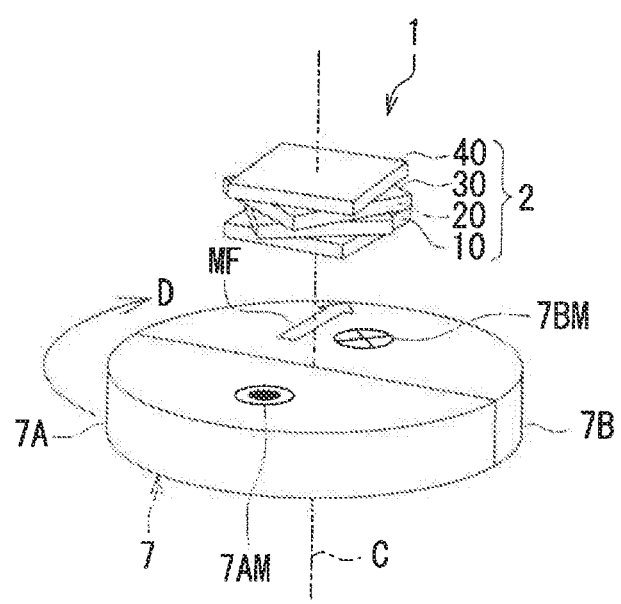
FIG. 13 is a perspective view illustrating the general configuration of an angle sensor system according to a second embodiment of the invention.

The magnetic field generation unit 7 includes a first portion 7A and a second portion 7B magnetized in mutually different directions. The first portion 7A and the second portion 7B are arranged symmetrically with respect to an imaginary plane including the central axis of the cylindrical shape. In FIG. 13, the symbol 7AM represents the magnetization direction of the first portion 7A, and the symbol 7BM represents the magnetization direction of the second portion 7B. The magnetization direction 7AM of the first portion 7A is parallel to the central axis C. The magnetization direction 7AM is upward in FIG. 13. The magnetization direction 7BM of the second portion 7B is opposite to the direction 7AM.

In the present embodiment, the first to the fourth detection unit 10, 20, 30 and 40 of the angle sensor 2 are arranged to face an end face of the magnetic field generation unit 7. For ease of understanding, FIG. 13 illustrates the first to the fourth detection unit 10, 20, 30 and 40 as separate components. However, the first to the fourth detection unit 10, 20, 30 and 40 may be integrated into a single component. Further, while in FIG. 13 the first to the fourth detection unit 10, 20, 30 and 40 are stacked in a direction parallel to the central axis C, the order of stacking may be other than that shown in FIG. 13. The relative position of the magnetic field generation unit 7 with respect to the first to the fourth detection unit 10, 20, 30 and 40 varies in the rotational direction D.

The angle sensor system 1 according to the present embodiment may be configured in other ways than illustrated in FIG. 13. For example, the magnetic field generation unit 7 and the first to the fourth detection unit 10, 20, 30 and 40 arranged as illustrated in FIG. 13 may be configured so that: the first to the fourth detection unit 10, 20, 30 and 40 rotate while the magnetic field generation unit 7 is fixed; the magnetic field generation unit 7 and the detection units 10, 20, 30 and 40 rotate in mutually opposite directions; or the magnetic field generation unit 7 and the detection units 10, 20, 30 and 40 rotate in the same direction with mutually different angular velocities. In all the cases, the relative position of the magnetic field generation unit 7 with respect to the detection units 10, 20, 30 and 40 rotates about the central axis C in the rotational direction D.

Figure 14:
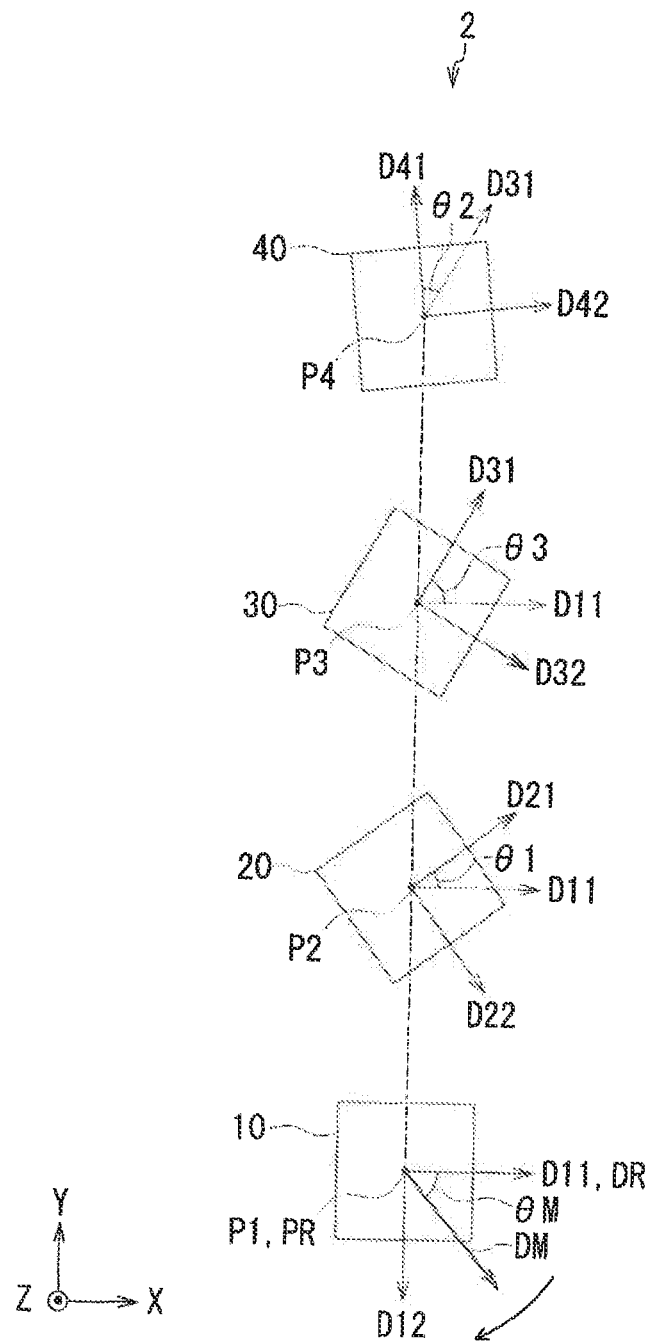
FIG. 14 is an explanatory diagram illustrating the definitions of directions and angles used in the second embodiment of the invention.

Now, the definitions of directions and angles used in the present embodiment will be described with reference to FIGS. 13 and 14. In the present embodiment, the Z direction is the direction parallel to the central axis C shown in FIG. 13 and upward in FIG. 13. In FIG. 14, the X direction is rightward, the Y direction is upward, and the Z direction is out of the plane of the drawing.

As has been described in relation to the first embodiment, the first to the fourth detection unit 10, 20, 30 and 40 detect the rotating magnetic field MF in the first to the fourth position P1, P2, P3 and P4, respectively. In the present embodiment, the first to the fourth position P1 to P4 coincide with each other in the rotational direction D so that the rotating magnetic field MF is in the same direction DM in the first to the fourth position P1 to P4.

The reference plane in the present embodiment is parallel to one of the end faces of the magnetic field generation unit 7 and perpendicular to the central axis C. In the present embodiment, the first position P1 is the reference position PR, and the X direction is the reference direction DR. Assume that the direction DM of the rotating magnetic field MF rotates clockwise in FIG. 14. The angle that the direction DM of the rotating magnetic field MF in the reference position PR forms with respect to the reference direction DR, i.e., the rotating field angle θM, will be expressed in positive values when seen clockwise from the reference direction DR, and in negative values when seen counterclockwise from the reference direction DR.

A first direction D11, a second direction D21, a third direction D31, a fourth direction D41, a fifth direction D12, a sixth direction D22, a seventh direction D32, and an eighth direction D42 will be defined as shown in FIG. 14. The first to the eighth direction D11, D21, D31, D41, D12, D22, D32 and D42 are all parallel to the reference plane. The first to the fourth direction D11, D21, D31 and D41 are different from each other. In the present embodiment, the first direction D11 is the same as the X direction and the reference direction DR. The second direction D21 is a direction that is rotated counterclockwise from the first direction D11 by an angle θ1. The third direction D31 is a direction that is rotated counterclockwise from the first direction D11 by an angle θ3. The fourth direction D41 is a direction that is rotated counterclockwise from the third direction D31 by an angle θ2. The specific values of the angles θ1 to θ3 will be described later.

The fifth to the eighth direction D12, D22, D32 and D42 are directions that are rotated by a predetermined angle from the first to the fourth direction D11, D21, D31 and D41, respectively. In the present embodiment, the fifth to the eighth direction D12, D22, D32 and D42 are directions that are rotated clockwise by 90° from the first to the fourth direction D11, D21, D31 and D41, respectively.

In the present embodiment, the first to the fourth detection unit 10, 20, 30 and 40 may be arranged in such a positional relationship that the first to the fourth direction D11, D21, D31 and D41 are different from each other while the rotating magnetic field MF is in the same direction DM in the first to the fourth position P1 to P4.

The relationships between the magnetization directions of the magnetization pinned layers in the first to the fourth detection unit 10, 20, 30 and 40 and the first to the eighth direction D11, D21, D31, D41, D12, D22, D32 and D42 are the same as those in the first embodiment.

As in the first embodiment, the first to the fourth detection unit 10, 20, 30 and 40 may be constructed of four discrete components. The four discrete components may have the same mechanical structure and be configured so that the magnetizations of the plurality of magnetization pinned layers are in the same relative direction with respect to the mechanical structure. In such a case, the second detection unit 20 is placed in an orientation rotated counterclockwise by the angle θ1 with respect to the first detection unit 10. The third detection unit 30 is placed in an orientation rotated counterclockwise by the angle θ3 with respect to the first detection unit 10. The fourth detection unit 40 is placed in an orientation rotated counterclockwise by the angle θ2 with respect to the third detection unit 30.

Alternatively, the first to the fourth detection unit 10, 20, 30 and 40 may have the same mechanical structure and be placed in the same orientation while the magnetization pinned layers of the MR elements included therein have respective magnetization directions determined for the respective corresponding MR elements.

The first to the fourth detection unit 10, 20, 30 and 40 are arranged in a positional relationship that establishes the first to the eighth phase relationship described in relation to the first embodiment. Now, a description will be given of a first example and a second example of the present embodiment. The first example will be described first. The first to the eighth phase relationship according to the first example of the present embodiment are the same as those according to the first example of the first embodiment. In the first example, the first and the second detection unit 10 and 20 are arranged to establish the first and the second phase relationship according to the first example. To be more specific, the first and the second direction D11 and D21 are defined to make the angle θ1 of FIG. 14 have a magnitude equivalent to an electrical angle of 180°/n. The third and the fourth detection unit 30 and 40 are arranged to establish the third and the fourth phase relationship according to the first example. To be more specific, the third and the fourth direction D31 and D41 are defined to make the angle θ2 of FIG. 14 have a magnitude equivalent to an electrical angle of 180°/n. The first and the third detection unit 10 and 30 are arranged to establish the fifth and the sixth phase relationship according to the first example. To be more specific, the first and the third direction D11 and D31 are defined to make the angle θ3 of FIG. 14 have a magnitude equivalent to an electrical angle of 180°/m. The seventh and the eighth phase relationship according to the first example are achieved by defining the first to the fourth direction D11, D21, D31 and D41 in such a way as to establish the first to the sixth phase relationship according to the first example.

In the present embodiment, in particular, m is 3 and n is 5. Thus, 180°/m is 60°, and 180°/n is 36°. One period of the first to the eighth detection signal S1 to S8, i.e., an electrical angle of 360°, is equivalent to one rotation of the magnetic field generation unit 7, i.e., a rotational angle of 360° of the magnetic field generation unit 7. Thus, in the first example, the first to the fourth direction D11, D21, D31 and D41 are defined to make both of the angles θ1 and θ2 be 36° and make the angle θ3 be 60°.

According to the first example, when it is the second cause that distorts the waveform of each of the first to the eighth detection signal S1 to S8, if the first and the second detection signal S1 and S2 are respectively expressed by Eqs. (1) and (2) of the first embodiment, then the third to the eighth detection signal S3 to S8 are respectively expressible by Eqs. (3) to (8) of the first embodiment.

The second example will now be described. The first to the eighth phase relationship according to the second example of the present embodiment are the same as those according to the second example of the first embodiment. In the second example, the first and the second detection unit 10 and 20 are arranged to establish the first and the second phase relationship according to the second example. To be more specific, the first and the second direction D11 and D21 are defined to make the angle θ1 of FIG. 14 have a magnitude equivalent to an electrical angle of 360°/n. The third and the fourth detection unit 30 and 40 are arranged to establish the third and the fourth phase relationship according to the second example. To be more specific, the third and the fourth direction D31 and D41 are defined to make the angle θ2 of FIG. 14 have a magnitude equivalent to an electrical angle of 360°/n. The first and the third detection unit 10 and 30 are arranged to establish the fifth and the sixth phase relationship according to the second example. To be more specific, the first and the third direction D11 and D31 are defined to make the angle θ3 of FIG. 14 have a magnitude equivalent to an electrical angle of 360°/m. The seventh and the eighth phase relationship according to the second example are achieved by defining the first to the fourth direction D11, D21, D31 and D41 in such a way as to establish the first to the sixth phase relationship according to the second example.

In the present embodiment, in particular, 360°/n is 72°, and 360°/m is 120°. In the second example, the first to the fourth direction D11, D21, D31 and D41 are defined to make both of the angles θ1 and θ2 be 72° and make the angle θ3 be 120°.

According to the second example, when it is the second cause that distorts the waveform of each of the first to the eighth detection signal S1 to S8, if the first and the second detection signal S1 and S2 are respectively expressed by Eqs. (1) and (2) of the first embodiment, then the third to the eighth detection signal S3 to S8 are respectively expressible by Eqs. (9) to (14) of the first embodiment.

The present embodiment enables reduction of the angular error resulting from the first and the second error component when the causes of distortion of the waveform of each of the first to the eighth detection signal S1 to S8 include the second cause.

The positional relationship between the first to the fourth detection unit 10, 20, 30 and 40 of the present embodiment may be applied to the angle sensor system 1 according to the first embodiment. The other configuration, function and effects of the present embodiment are the same as those of the first embodiment.

Third Embodiment

A third embodiment of the invention will now be described. First, reference is made to FIG. 15 to describe the general configuration of the angle sensor system according to the third embodiment. The angle sensor system 1 according to the third embodiment differs from that according to the first embodiment in the following ways. The angle sensor system 1 according to the third embodiment includes a magnetic field generation unit 8

Figure 15:
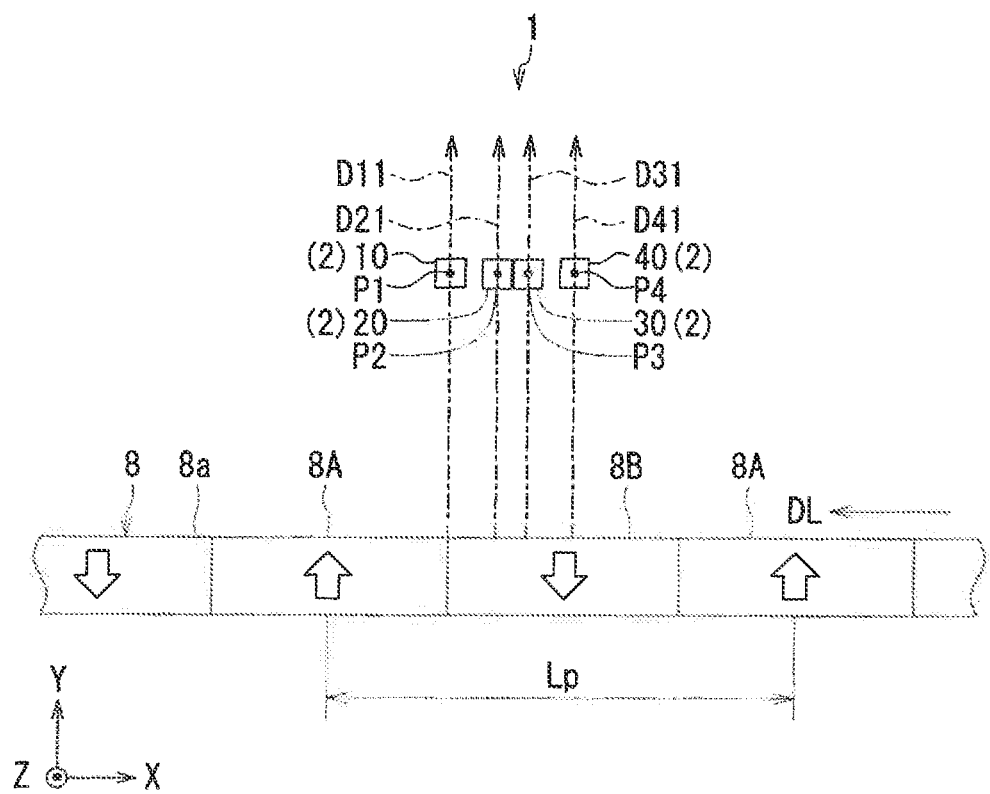
FIG. 15 is an explanatory diagram illustrating the general configuration of an angle sensor system according to a third embodiment of the invention.

In FIG. 15, the X direction is rightward, the Y direction is upward, and the Z direction is out of the plane of the drawing. The magnetic field generation unit 8 includes a plurality of sets of the first and second portions 8A and 8B arranged alternately in a linear configuration along the X direction. The first portion 8A and the second portion 8B are magnetized in mutually opposite directions. In FIG. 15, the hollow arrows indicate the magnetization directions of the portions 8A and 8B. In FIG. 15, each first portion 8A is magnetized in the Y direction, and each second portion 8B is magnetized in the opposite direction thereto.

The magnetic field generation unit 8 has a side surface 8a parallel to the X direction. In the present embodiment, the first to the fourth detection unit 10, 20, 30 and 40 of the angle sensor 2 are arranged to face the side surface 8a of the magnetic field generation unit 8.

One of the angle sensor 2 and the magnetic field generation unit 8 moves linearly in response to the movement of a moving body (not illustrated). This varies the relative position of the magnetic field generation unit 8 with respect to the first to the fourth detection unit 10, 20, 30 and 40 in a predetermined direction DL. The direction DL is parallel to the X direction. In the example shown in FIG. 15, the direction DL is the −X direction.

Now, the arrangement of the first to the fourth detection unit 10, 20, 30 and 40 and the definitions of directions and angles in the present embodiment will be described with reference to FIGS. 15 and 16. As has been described in relation to the first embodiment, the first to the fourth detection unit 10, 20, 30 and 40 detect a rotating magnetic field MF in the first to the fourth position P1, P2, P3 and P4, respectively. In the present embodiment, the first to the fourth position P1, P2, P3 and P4 are different from each other so that the directions DM of the rotating magnetic field MF in the first to the fourth position P1, P2, P3 and P4 are different from each other.

Figure 16:
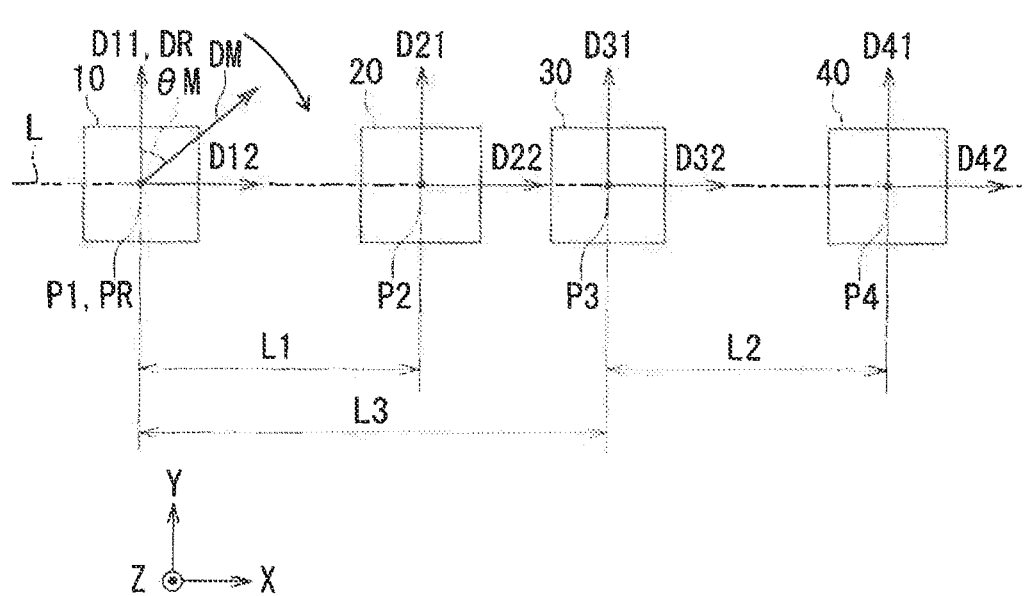
FIG. 16 is an explanatory diagram illustrating the definitions of directions and angles used in the third embodiment of the invention.

As shown in FIG. 16, the first to the fourth position P1 to P4 are on an imaginary straight line L parallel to the direction DL (the −X direction) and different from each other. The second position P2 is at a distance of L1 in the X direction from the first position P1. The third position P3 is at a distance of L3 in the X direction from the first position P1. The fourth position P4 is at a distance of L2 in the X direction from the third position P3. The specific values of the distances L1 to L3 will be described in later.

The reference plane in the present embodiment is perpendicular to the Z direction. The reference position PR is located within the reference plane. In the present embodiment, the first position P1 is the reference position PR, and the Y direction is the reference direction DR. Assume that the direction DM of the rotating magnetic field MF rotates clockwise in FIG. 16. The angle that the direction DM of the rotating magnetic field MF in the reference position PR forms with respect to the reference direction DR, i.e., the rotating field angle θM, will be expressed in positive values when seen clockwise from the reference direction DR, and in negative values when seen counterclockwise from the reference direction DR.

A first direction D11, a second direction D21, a third direction D31, a fourth direction D41, a fifth direction D12, a sixth direction D22, a seventh direction D32, and an eighth direction D42 will be defined as shown in FIG. 16. All the first to the eighth direction D11, D21, D31, D41, D12, D22, D32 and D42 are parallel to the reference plane. In the present embodiment, the first to the fourth direction D11, D21, D31 and D41 are the Y direction.

The fifth to the eighth direction D12, D22, D32 and D42 are directions that are rotated by a predetermined angle from the first to the fourth direction D11, D21, D31 and D41, respectively. In the present embodiment, the fifth to the eighth direction D12, D22, D32 and D42 are directions that are rotated clockwise by 90° from the first to the fourth direction D11, D21, D31 and D41, respectively.

The first to the fourth position P1, P2, P3 and P4 are located in the first to the fourth detection unit 10, 20, 30 and 40, respectively. The first to the fourth detection unit 10, 20, 30 and 40 are arranged in such a positional relationship that the first to the fourth position P1, P2, P3 and P4 are different from each other as described above.

The relationships between the magnetization directions of the magnetization pinned layers in the first to the fourth detection unit 10, 20, 30 and 40 and the first to the eighth direction D11, D21, D31, D41, D12, D22, D32 and D42 are the same as those in the first embodiment.

As in the first embodiment, the first to the fourth detection unit 10, 20, 30 and 40 may be constructed of four discrete components. The four discrete components may have the same mechanical structure and be configured so that the magnetizations of the plurality of magnetization pinned layers are in the same relative direction with respect to the mechanical structure. Alternatively, the first to the fourth detection unit 10, 20, 30 and 40 may be integrated into one component.

The first to the fourth detection unit 10, 20, 30 and 40 are arranged in a positional relationship that establishes the first to the eighth phase relationship described in relation to the first embodiment. Now, a description will be given of a first example and a second example of the present embodiment.

The first example will now be described first. The first to the eighth phase relationship according to the first example of the present embodiment are the same as those according to the first example of the first embodiment. In the first example, the first and the second detection unit 10 and 20 are arranged to establish the first and the second phase relationship according to the first example. To be more specific, the first and the second position P1 and P2 are defined to make the distance L1 of FIG. 16 have a magnitude equivalent to an electrical angle of 180°/n. The third and the fourth detection unit 30 and 40 are arranged to establish the third and the fourth phase relationship according to the first example. To be more specific, the third and the fourth position P3 and P4 are defined to make the distance L2 of FIG. 16 have a magnitude equivalent to an electrical angle of 180°/n. The first and the third detection unit 10 and 30 are arranged to establish the fifth and the sixth phase relationship according to the first example. To be more specific, the first and the third position P1 and P3 are defined to make the distance L3 of FIG. 16 have a magnitude equivalent to an electrical angle of 180°/m. The seventh and the eighth phase relationship according to the first example are achieved by defining the first to the fourth position P1 to P4 in such a way as to establish the first to the sixth phase relationship according to the first example.

In the magnetic field generation unit 8, the distance between the centers of two first portions 8A adjacent to each other with one second portion 8B in between is equal to the distance between the centers of two second portions 8B adjacent to each other with one first portion 8A in between. As shown in FIG. 15, the distance between the centers of two first portions 8A adjacent to each other with one second portion 8B in between will be referred to as one pitch and denoted by the symbol Lp. One period of the first to the eighth detection signal S1 to S8, i.e., an electrical angle of 360°, is equivalent to one pitch. Thus, the magnitude equivalent to an electrical angle of 180°/n is Lp/(2n), and the magnitude equivalent to an electrical angle of 180°/m is Lp/(2 m).

In the first example, the first to the fourth position P1 to P4 are defined to make both of the distances L1 and L2 be Lp/(2n) and make the distance L3 be Lp/(2 m). In the present embodiment, m is 3 and n is 5, in particular. Thus, in the first example, the first to the fourth position P1 to P4 are defined to make both of the distances L1 and L2 be Lp/10 and make the distance L3 be Lp/6.

According to the first example, regardless of whether the first cause or the second cause distorts the waveform of each of the first to the eighth detection signal S1 to S8, if the first and the second detection signal S1 and S2 are respectively expressed by Eqs. (1) and (2) of the first embodiment, then the third to the eighth detection signal S3 to S8 are respectively expressible by Eqs. (3) to (8) of the first embodiment.

Next, the second example will be described. The first to the eighth phase relationship according to the second example of the present embodiment are the same as those according to the second example of the first embodiment. In the second example, the first and the second detection unit 10 and 20 are arranged to establish the first and the second phase relationship according to the second example. To be more specific, the first and the second position P1 and P2 are defined to make the distance L1 of FIG. 16 have a magnitude equivalent to an electrical angle of 360°/n. The third and the fourth detection unit 30 and 40 are arranged to establish the third and the fourth phase relationship according to the second example. To be more specific, the third and the fourth position P3 and P4 are defined to make the distance L2 of FIG. 16 have a magnitude equivalent to an electrical angle of 360°/n. The first and the third detection unit 10 and 30 are arranged to establish the fifth and the sixth phase relationship according to the second example. To be more specific, the first and the third position P1 and P3 are defined to make the distance L3 of FIG. 16 have a magnitude equivalent to an electrical angle of 360°/m. The seventh and the eighth phase relationship according to the second example are achieved by defining the first to the fourth position P1 to P4 in such a way as to establish the first to the sixth phase relationship according to the second example.

The magnitude equivalent to an electrical angle of 360°/n is Lp/n, and the magnitude equivalent to an electrical angle of 360°/m is Lp/m. In the second example, the first to the fourth position P1 to P4 are defined to make both of the distances L1 and L2 be Lp/n and make the distance L3 be Lp/m. In the present embodiment, m is 3 and n is 5, in particular. Thus, in the second example, the first to the fourth position P1 to P4 are defined to make both of the distances L1 and L2 be Lp/5 and make the distance L3 be Lp/3.

According to the second example, regardless of whether the first cause or the second cause distorts the waveform of each of the first to the eighth detection signal S1 to S8, if the first and the second detection signal S1 and S2 are respectively expressed by Eqs. (1) and (2) of the first embodiment, then the third to the eighth detection signal S3 to S8 are respectively expressible by Eqs. (9) to (14) of the first embodiment.

Like the first embodiment, the present embodiment enables reduction of the angular error resulting from the first and the second error component when the causes of distortion of the waveform of each of the first to the eighth detection signal S1 to S8 include at least one of the first cause and the second cause.

The other configuration, function and effects of the present embodiment are the same as those of the first embodiment.

Fourth Embodiment

Figure 17:
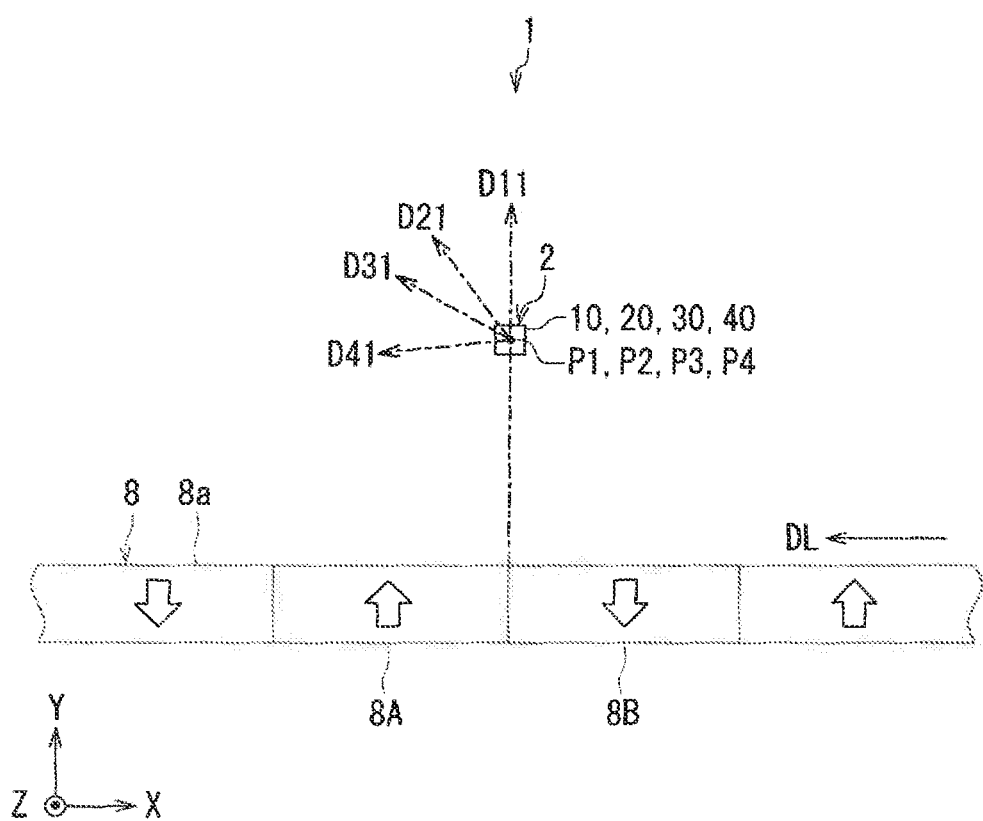
FIG. 17 is an explanatory diagram illustrating the general configuration of an angle sensor system according to a fourth embodiment of the invention.

Reference is now made to FIG. 17 to describe the general configuration of an angle sensor system according to a fourth embodiment of the invention. The angle sensor system 1 according to the fourth embodiment differs from that according to the third embodiment in the following ways. In the fourth embodiment, the first to the fourth position P1 to P4 coincide with each other in a predetermined direction DL so that the rotating magnetic field MF is in the same direction DM in the first to the fourth position P1 to P4.

In the present embodiment, the first to the fourth detection unit 10, 20, 30 and 40 are arranged in such a positional relationship that the first to the fourth direction D11, D21, D31 and D41 are different from each other while the rotating magnetic field MF is in the same direction DM in the positions where the first to the fourth detection unit 10, 20, 30 and 40 are located, as in the second embodiment. The definitions of the first to the fourth direction D11, D21, D31 and D41 are as illustrated in FIG. 14 and described in relation to the second embodiment. The specific details of the positional relationship between the first to the fourth detection unit 10, 20, 30 and 40 are the same as those in the second embodiment.

The present embodiment enables reduction of the angular error resulting from the first and the second error component when the causes of distortion of the waveform of each of the first to the eighth detection signal S1 to S8 include the second cause.

The other configuration, function and effects of the present embodiment are the same as those of the second or third embodiment.

The present invention is not limited to the foregoing embodiments, and various modifications may be made thereto. For example, the angle detection unit of the angle sensor of the present invention may include a part for performing processing for reducing an angular error resulting from an error component other than the first and the second error component contained in each detection signal.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. An angle sensor for generating a detected angle value, the detected angle value having a correspondence with an angle that a direction of a rotating magnetic field in a reference position forms with respect to a reference direction, the angle sensor comprising:
   a first detector including a first and a second detection signal generator for generating a first and a second detection signal, respectively, each of the first and the second detection signal having a correspondence with an angle that the direction of the rotating magnetic field in a first position forms with respect to a first direction;
   a second detector including a third and a fourth detection signal generator for generating a third and a fourth detection signal, respectively, each of the third and the fourth detection signal having a correspondence with an angle that the direction of the rotating magnetic field in a second position forms with respect to a second direction; and
   an angle detector including:
      a first computing circuit for generating a first signal by performing operations including a first operation, the first signal being lower in a first error component than the first and the third detection signal;
      a second computing circuit for generating a second signal by performing operations including a second operation, the second signal being lower in the first error component than the second and the fourth detection signal; and
      an angle computer for calculating the detected angle value based on the first and the second signal,
   wherein when the direction of the rotating magnetic field varies with a predetermined period, each of the first to the fourth detection signal contains an ideal component and the first error component,
   the ideal component varies periodically in such a manner as to trace an ideal sinusoidal curve,
   the first error component is an error component corresponding to an n-th harmonic of the ideal component, n being 5 or more,
   the ideal components of the first and the second detection signal are different in phase from each other, resulting in a first phase difference,
   the ideal components of the third and the fourth detection signal are different in phase from each other, resulting in a second phase difference,
   the first detector and the second detector are arranged in a positional relationship that establishes a first phase relationship between the ideal components of the first and the third detection signal, and a second phase relationship between the ideal components of the second and the fourth detection signal,
   the first phase relationship is such a relationship that performing the first operation to obtain a sum of or difference between the first and the third detection signal yields a signal that is lower in the first error component than the first and the third detection signal, and
   the second phase relationship is such a relationship that performing the second operation to obtain a sum of or difference between the second and the fourth detection signal yields a signal that is lower in the first error component than the second and the fourth detection signal.

2. The angle sensor according to claim 1, wherein the positional relationship between the first detector and the second detector is such a relationship that the first position and the second position are different from each other so that the direction of the rotating magnetic field in the first position and the direction of the rotating magnetic field in the second position are different from each other.

3. The angle sensor according to claim 1, wherein the positional relationship between the first detector and the second detector is such a relationship that the first direction and the second direction are different from each other while the direction of the rotating magnetic field in the first position is same as the direction of the rotating magnetic field in the second position.

4. The angle sensor according to claim 1, wherein
   the first phase relationship is a relationship in which the ideal components of the first and the third detection signal have a phase difference of 180°/n,
   the second phase relationship is a relationship in which the ideal components of the second and the fourth detection signal have a phase difference of 180°/n,
   the first operation is an operation to obtain the sum of the first and the third detection signal, and
   the second operation is an operation to obtain the sum of the second and the fourth detection signal.

5. The angle sensor according to claim 1, wherein
   the first phase relationship is a relationship in which the ideal components of the first and the third detection signal have a phase difference of 360°/n,
   the second phase relationship is a relationship in which the ideal components of the second and the fourth detection signal have a phase difference of 360°/n,
   the first operation is an operation to obtain the difference between the first and the third detection signal, and
   the second operation is an operation to obtain the difference between the second and the fourth detection signal.

6. The angle sensor according to claim 1, wherein the first phase difference and the second phase difference are both 90°.

7. The angle sensor according to claim 1, wherein each of the first to the fourth detection signal generator includes at least one magnetic detection element.

8. The angle sensor according to claim 7, wherein
   the at least one magnetic detection element includes at least one magnetoresistance element, and
   the at least one magnetoresistance element includes a magnetization pinned layer whose magnetization direction is pinned, a free layer whose magnetization direction varies depending on the direction of the rotating magnetic field, and a nonmagnetic layer located between the magnetization pinned layer and the free layer.

9. An angle sensor system comprising:
   the angle sensor according to claim 1; and
   a magnetic field generator for generating the rotating magnetic field.

10. The angle sensor system according to claim 9, wherein the positional relationship between the first detector and the second detector is such a relationship that the first position and the second position are different from each other so that the direction of the rotating magnetic field in the first position and the direction of the rotating magnetic field in the second position are different from each other.

11. The angle sensor system according to claim 10, wherein
- the magnetic field generator is configured to vary its relative position with respect to the first and the second detector in a predetermined direction, and
- the first position and the second position are different from each other in the predetermined direction.

12. The angle sensor system according to claim 11, wherein
- the magnetic field generator is configured to rotate about a central axis,
- the predetermined direction is the direction of rotation of the magnetic field generator, and
- the first position and the second position are in an imaginary plane perpendicular to the central axis and located at a same distance from the central axis.

13. The angle sensor system according to claim 11, wherein
- the first position and the second position are on an imaginary straight line and different from each other, and
- the predetermined direction is parallel to the imaginary straight line.

14. The angle sensor system according to claim 9, wherein the positional relationship between the first detector and the second detector is such a relationship that the first direction and the second direction are different from each other while the direction of the rotating magnetic field in the first position is same as the direction of the rotating magnetic field in the second position.

* * * * *